(12) United States Patent
Tamstorf et al.

(10) Patent No.: US 9,135,738 B2
(45) Date of Patent: Sep. 15, 2015

(54) EFFICIENT ELASTICITY FOR CHARACTER SKINNING

(75) Inventors: Rasmus Tamstorf, Los Angeles, CA (US); Andrew Selle, Montrose, CA (US); Aleka McAdams, Encino, CA (US); Eftychios Sifakis, Verona, WI (US); Joseph Teran, Los Angeles, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 815 days.

(21) Appl. No.: 13/331,920

(22) Filed: Dec. 20, 2011

(65) Prior Publication Data

US 2012/0281019 A1    Nov. 8, 2012

Related U.S. Application Data

(60) Provisional application No. 61/481,626, filed on May 2, 2011.

(51) Int. Cl.
  *G06T 19/20*    (2011.01)
  *G06T 13/00*    (2011.01)
  *G06T 3/00*    (2006.01)

(52) U.S. Cl.
  CPC .............. *G06T 13/00* (2013.01); *G06T 3/0093* (2013.01); *G06T 19/20* (2013.01); *G06T 2219/2021* (2013.01)

(58) Field of Classification Search
  CPC ... G06T 2210/44; G06T 3/0093; G06T 13/00; G06T 2219/2021
  See application file for complete search history.

(56) References Cited

U.S. PATENT DOCUMENTS

| 2007/0097125 A1 | 5/2007 | Xie et al. |
| 2009/0135189 A1 | 5/2009 | Kim et al. |

FOREIGN PATENT DOCUMENTS

GB    2002/015309 A1    1/2002

OTHER PUBLICATIONS

Yoo et al., Stabilized Conforming nodal integration in the natural-element method, International Journal for Numerical Methods in Engineering, Int. J. Numer. Meth. Engng. 2004: 60:861-890.*
Bank et al., The Hierarchical Basis Multigrid Method, Numer. Math. 52, 427-458 (1988).*

(Continued)

*Primary Examiner* — James A Thompson
*Assistant Examiner* — Tapas Mazumder
(74) *Attorney, Agent, or Firm* — Kilpatrick Townsend & Stockton LLP

(57) ABSTRACT

A novel algorithmic framework is presented for the simulation of hyperelastic soft tissues that drastically improves each aspect discussed above compared to existing techniques. The approach is robust to large deformation (even inverted configurations) and extremely stable by virtue of careful treatment of linearization. Additionally, a new multigrid approach is presented to efficiently support hundreds of thousands of degrees of freedom (rather than the few thousands typical of existing techniques) in a production environment. Furthermore, these performance and robustness improvements are guaranteed in the presence of both collision and quasistatic/implicit time stepping techniques. The result is a significant advance in the applicability of hyperelastic simulation to skeleton driven character skinning.

22 Claims, 16 Drawing Sheets

(56) References Cited

OTHER PUBLICATIONS

Terzopoulos, Elastically Deformable Models, SIGGRAPH '87 Proceedings of the 14th annual conference on Computer graphics and interactive techniques, pp. 205-214 ACM New York, NY, USA © 1987.*

Capell, et al., "Interactive skeleton-driven dynamic deformations," Proc. SIGGRAPH '02, 2002, pp. 586-593.

Capell, et al., "Physically based rigging for deformable characters," Proc. 2005 ACM SIGGRAPH/Eurographics Symp. Comput. Anim., 2005, 10 pages.

Chadwick, et al., "Layered construction for deformable animated characters," Proc. SIGGRAPH '89, 1989, pp. 243-252.

Chao, et al., "A simple geometric model for elastic deformations," ACM Trans. Graph., Jul. 2010, vol. 29, 6 pages.

Dick, et al., "A realtime multigrid finite hexahedra method for elasticity simulation using CUDA," Sim. Mod. Prac. Th., 2011, vol. 19, No. 2, pp. 801-816.

Galoppo, et al., "Soft articulated characters with fast contact handling," Comput. Graph., 2007, Forum 26, pp. 243-253.

Georgii, et al., "A multigrid framework for real-time simulation of deformable bodies," Comput. Grap., 2006, vol. 30, No. 3, pp. 408-415.

Irving, et al., "Simulating the devolved: finite elements on walle," ACM SIGGRAPH 2008 talks, ACM, New York, NY, USA, SIGGRAPH '08, 2008, 1 page.

Kavan, et al., "Geometric skinning with approximate dual quaternion blending," ACM Trans. Graph., 2008, vol. 27, 23 pages.

Kry, et al., "Eigenskin: real time large deformation character skinning in hardware," Proc. ACM SIGGRAPH/Eurographics Symp. Comput. Anim., 2002, pp. 153-159.

Lewis, et al., "Pose space deformation: a unified approach to shape interpolation and skeleton-driven deformation," Proc. SIGGRAPH '00, 2000, pp. 165-172.

Magnenat-Thalmann, et al., "Joint-dependent local deformations for hand animation and object grasping," Proc. Graph. Inter. '88, 1988, pp. 26-33.

Müller, et al., "Interactive virtual materials," Proc. GI '04, 2004, pp. 239-246.

Müller, et al., "Stable real-time deformations," Proc. 2002 ACM SIGGRAPH/Eurographics Symp. Comput. Anim., 2002, pp. 49-54.

Merry, et al., "Animation Space: A Truly Linear Framework for Character Animation," ACM Trans. Graph., 2006, vol. 25, pp. 1400-1423.

Müller, et al., "Meshless deformations based on shape matching," ACM Trans. Graph., 2005, vol. 24, pp. 471-478.

Rivers, et al., "Fastlsm: fast lattice shape matching for robust real-time deformation," ACM Trans. Graph., 2007, vol. 26, 6 pages.

Sifakis, et al., "Hybrid simulation of deformable solids," Proc. of ACM SIGGRAPH/Eurographics Symp. on Comput. Anim., 2007, pp. 81-90.

Sloan, et al., "Shape by example," Proc. I3D '01, 2001, pp. 135-143.

Sueda, et al., "Musculotendon simulation for hand animation," ACM Trans.Graph., 2008, vol. 27, No. 3.

Teran, et al., "Robust quasistatic finite elements and flesh simulation," Proc. of the 2005 ACM SIGGRAPH/Eurographics Symp. on Comput. Anim., 2005, pp. 181-190.

Terzopoulus, et al., "Physically-based facial modeling, analysis and animation," J. Vis. Comput. Anim., 1990, vol. 1, pp. 73-80.

Twigg, et al., "Point Cloud Glue: constraining simulations using the procrustes transform," Proceedings of the 2010 ACM SIGGRAPH/Eurographics Symposium on Computer Animation, Eurographics Association, 2010, pp. 45-54.

Wang, et al., "Multi-weight enveloping: least-squares approximation techniques for skin animation" Proc. 2002 ACM SIGGRAPH/Eurographics Symp. Comput. Anim., 2002, pp. 129-138 and 197.

Wu, et al. "Multigrid integration for interactive deformable body simulation," Med. Sim., 2004, vol. 3078, pp. 92-104.

Zhu, et al., "An efficient multigrid method for the simulation of high-resolution elastic solids," ACM Trans. Graph., 2010, vol. 29, 18 pages.

Search Report for United Kingdom Application No. GB1207186.6, dated Aug. 24, 2012, 3 pages.

* cited by examiner

EFFICIENT ELASTICITY FOR CHARACTER SKINNING

CROSS-REFERENCE TO RELATED APPLICATIONS

This Application claims priority to and the benefit of U.S. Provisional Application No. 61/481,626, filed May 5, 2011 and entitled "EFFICIENT ELASTICITY FOR CHARACTER SKINNING," the entire disclosure of which is hereby incorporated by reference for all purposes.

BACKGROUND

Creating appealing characters has been one essential desire for feature animation. One challenging aspect is the production of life-like deformations for soft tissues comprising both humans and animals. In order to provide the necessary control and performance for an animator, such deformations are typically computed using a skinning technique and/or an example based interpolation method. Meanwhile, physical simulation of flesh-like material is usually avoided or relegated to an offline process due to its high computational cost. However, simulations create a range of very desirable effects, like squash-and-stretch and contact deformations. The latter is especially desirable as it can guarantee pinch-free geometry, which is important for subsequent simulations like cloth and hair.

Although the benefits of solving the equations of the underlying physical laws for character deformation are clear, computational methods are traditionally far too slow to accommodate the rapid interaction demanded by animators. Many simplified approaches to physical simulation can satisfy interactivity demands, but any such approach must provide all of the following functionality to be useful in production: (1) robustness to large deformation, (2) support for high-resolution geometric detail, and (3) fast and accurate collision response (both self and external objects). Ideally, for rigging, any simplified approach should also provide path independent deformations determined completely by a kinematic skeleton.

Accordingly, what is desired is a framework for the simulation of soft tissues that targets all aspects discussed above. Additionally, what is desired is to solve problems related to character skinning, some of which may be discussed herein, and reduce drawbacks related to character skinning, some of which may be discussed herein.

BRIEF SUMMARY

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

Whereas previous works have addressed many of the concerns related to robustness to large deformations, support for high-resolution geometric detail, and fast and accurate collision response individually, a novel algorithmic framework is disclosed for the simulation of soft tissues (e.g., hyperelastic tissues) that targets all of these concerns in various aspects. A complete production system for physics-based skinning of skeletally driven characters is provided that is robust to large deformation (even inverted configurations) and extremely stable by virtue of careful treatment of linearization. In further aspects, the production system incorporates a new multigrid approach to efficiently support hundreds of thousands of degrees of freedom (rather than the few thousands typical of existing techniques) in a production environment. Furthermore, the production system guarantees these performance and robustness improvements in the presence of both collision and quasistatic/implicit time stepping techniques.

In one embodiment, a method for deforming computer-generated objects includes receiving information identifying a first computer-generated object, receiving information identifying a hexahedral grid, receiving information identifying a set of material properties, and receiving kinematic information associated with a second computer-generated object. The first object may be a surface, a volume, a point cloud, or other n-dimensional geometry. Response of a continuum representation of a material is determined at one or more cells of the hexahedral grid embedding the second object according to the set of material properties and the kinematic information associated with the second object based on a stabilized energy discretization over the one or more cells of the hexahedral grid utilizing a one point quadrature at each of the one or more cells. Information configured to deform the first object from a first configuration to a second configuration is generated based on the determined response of the continuum representation of the material.

In one aspect, receiving the information identifying the hexahedral grid comprises receiving information specifying a uniform and regular hexahedral lattice. In another aspect, the continuum representation of the material comprises a co-rotational linear model of elasticity.

Determining the response of the continuum representation of the material at the one or more cells of the hexahedral grid embedding the second object according to the set of material properties and the kinematic information associated with the second object may include performing a single polar decomposition operation at each of the one or more cells. Determining the response of the continuum representation of the material at the one or more cells of the hexahedral grid embedding the second object according to the set of material properties and the kinematic information associated with the second object based on the stabilized energy discretization over the one or more cells of the hexahedral grid utilizing the one point quadrature at each of the one or more cells may further include determining a portion of another energy discretization.

In some embodiments, determining the response of the continuum representation of the material at the one or more cells of the hexahedral grid embedding the second object according to the set of material properties and the kinematic information associated with the second object may include identifying one or more constraints in the hexahedral grid. The one or more constraints in the hexahedral grid may be configured to handle self collisions. The one or more constraints in the hexahedral grid may further be configured to handle collisions with other objects.

In another aspect, determining the response of the continuum representation of the material at the one or more cells of the hexahedral grid embedding the second object according to the set of material properties and the kinematic information associated with the second object may include determining a hierarchy of discretizations wherein at least one coarse level in the hierarchy subsamples the deformation gradient of a deformation. The response may then be determined using a multigrid method and the hierarchy of discretizations. Determining, with the one or more processors associated with the one or more computer systems, the response of the continuum representation of the material at the one or more cells of the hexahedral grid embedding the second object according to the set of material properties and the kinematic information associated with the second object may also include generating information projecting each stiffness matrix associated with the one or more cells to its positive semi-definite counterpart. Determining the response of the continuum representation of the material at the one or more cells of the hexahedral grid embedding the second object according to the set of material properties and the kinematic information associated with the second object may also include determining the response using an exact derivative rather than an approximate derivative.

In further embodiments, determining the response of the continuum representation of the material at the one or more cells of the hexahedral grid embedding the second object according to the set of material properties and the kinematic information associated with the second object may include determining a portion of the response using a matrix-free representation of force derivatives. Determining the response of the continuum representation of the material at the one or more cells of the hexahedral grid embedding the second object according to the set of material properties and the kinematic information associated with the second object may include determining a portion of the response using a matrix-free extraction of diagonals.

In one embodiment, a non-transitory computer-readable medium storing computer-executable code for deforming computer-generated objects includes code for receiving information identifying a first computer-generated object, code for receiving information identifying a hexahedral grid, code for receiving information identifying a set of material properties, code for receiving kinematic information associated with a second computer-generated object, code for determining response of a continuum representation of a material at one or more cells of the hexahedral grid embedding the second object according to the set of material properties and the kinematic information associated with the second object based on a stabilized energy discretization over the one or more cells of the hexahedral grid utilizing a one point quadrature at each of the one or more cells, and code for generating information configured to deform the first object from a first configuration to a second configuration based on the determined response of the continuum representation of the material.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION

Introduction

Figure 1:
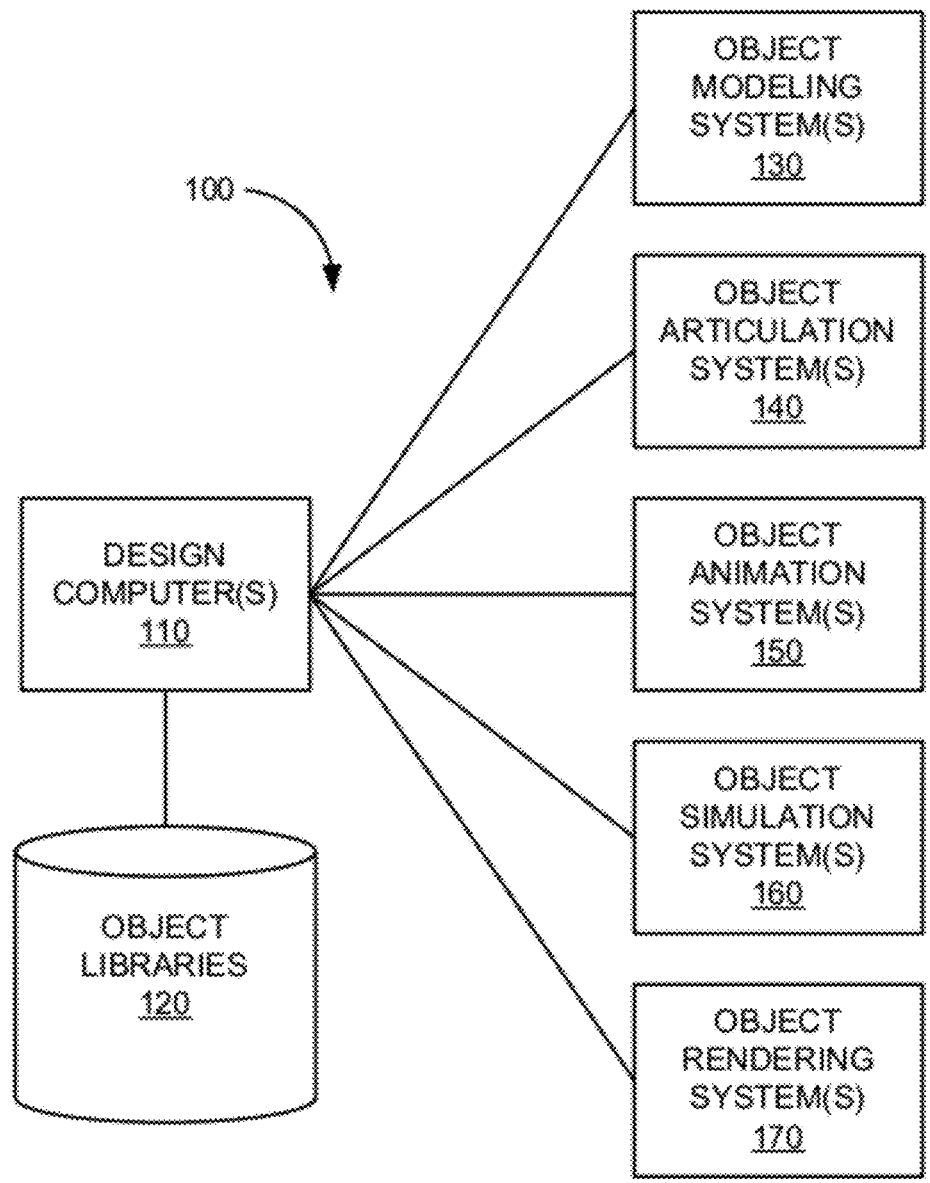
FIG. 1 is a simplified block diagram of a system for creating computer graphics imagery (CGI) and computer-aided animation that may implement or incorporate various embodiments or techniques for efficient elasticity for character skinning.

Whereas previous works have addressed many of the concerns related to robustness to large deformations, support for high-resolution geometric detail, and fast and accurate collision response individually, a novel algorithmic framework is disclosed for the simulation of soft tissues (e.g., hyperelastic tissues) that targets all of these concerns in various aspects. A complete production system for physics-based skinning of skeletally driven characters is provided that is robust to large deformation (even inverted configurations) and extremely stable by virtue of careful treatment of linearization. In further aspects, the production system incorporates a new multigrid approach to efficiently support hundreds of thousands of degrees of freedom (rather than the few thousands typical of existing techniques) in a production environment. Furthermore, the production system guarantees these performance and robustness improvements in the presence of both collision and quasistatic/implicit time stepping techniques.

Skeleton Driven Skin Deformation

Skeleton driven skin deformation was first introduced by [Magnenat-Thalmann et al. 1988]. Since then such techniques have been used extensively, especially the "linear blend skinning" technique (aka. "skeleton subspace deformation" (SSD) or "enveloping"). However, the limitations of such techniques are well-known and have been the topic of numerous papers [Wang and Phillips 2002; Merry et al. 2006; Kavan et al. 2008]. Despite improvements, skinning remains, for the most part purely kinematic. It has proven very difficult to get more accurate, physically based deformations (e.g., from self-collisions and contact with other objects).

Instead, such phenomena are typically created through a variety of example based approaches [Lewis et al. 2000; Sloan et al. 2001]. Although example based methods are computationally cheap, they often require extreme amounts of user input, especially for contact and collision. Recently, authors have also considered automatic means of fitting skeletons and binding their movement to deformation as in [Baran and Popovie 2007].

Simulation recently enabled significant advances to character realism in [Irving et al. 2008] and [Clutterbuck and Jacobs 2010], albeit with the luxury of extreme computation time. Nevertheless, these approaches demonstrated the promise of simulation. Many techniques reduce the accuracy of an elasticity model being simulated to help improve performance and interactivity. For example, [Terzopoulos and Waters 1990; Chadwick et al. 1989] first demonstrated the effectiveness of comparatively simple mass/spring based approaches. [Sueda et al. 2008] added interesting anatomic detail using the tendons and bones in the hand, but used simple surface-based skin. [Shi et al. 2008] used simplified surface-based spring forces to provide dynamics given an example skeleton and deformed poses. [Kry et al. 2002] used principle component analysis of off-line elasticity simulation to provide interactive physically based SSD. [Capell et al. 2005; Capell et al. 2002; Galopo et al. 2007] used a skeleton based local rotational model of simple linear elasticity. [Müller et al. 2005] introduced shape matching, a technique that uses quadratic modal elements defined per lattice cell, allowing realtime albeit less accurate deformations. [Rivers and James 2007] extended the accuracy of the shape matching method while maintaining high performance with a fast SVD.

Warped stiffness approaches [Muller et al. 2002; Muller and Gross 2004; Muller et al. 2004] are a more general example of the above techniques developed by Cappel et al. and use an inexact force differential to yield easily solvable symmetric positive definite (SPD) linearizations. However, [Chao et al. 2010] recently demonstrated the importance of a more accurate approximation to rotational force differentials lacking in warped stiffness approaches. The instability of the method hinders its use in skinning applications. Unfortunately, the more accurate linearizations yield indefinite systems and thus require more expensive linear algebra techniques (e.g., GMRES).

Typically elastic simulation requires the solution of large sparse systems. Conjugate gradients is one popular method for solving such systems by virtue of simplicity and low-memory overhead. However, the method is plagued by slow convergence (especially with high resolution models). Multigrid techniques potentially avoid these convergence issues, but can be costly to derive for problems over irregular domains. [Zhu et al. 2010] developed a multigrid approach that achieves nearly optimal convergence properties for incompressible materials on irregular domains. Yet, their technique for corotational elasticity uses a pseudo-Newton iteration that does not guarantee convergence on the large deformations typical in skeleton driven animation. [Dick et al. 2011; Georgii and Westermann 2006; Wu and Tendick 2004] also examine multigrid methods for rapidly solving the equations of corotational elasticity. Again, these techniques are based on the warped stiffness approximation to corotational force differentials and demonstrate similar convergence issues as Zhu et al.

System Overview

As multigrid has been shown to provide excellent parallel performance (e.g., on the GPU in [Dick et al. 2011] and on the CPU in [Zhu et al. 2010] and [Otaduy et al. 2007] consider FAS multigrid methods for solving implicit dynamics on unstructured grids), a character skinning system incorporates in one aspect multigrid approaches to robustly provide near-interactive performance for non-linear elasticity models with hundreds of thousands of degrees of freedom.

FIG. 1 is a simplified block diagram of system 100 for creating computer graphics imagery (CGI) and computer-aided animation that may implement or incorporate various embodiments or techniques for efficient elasticity for character skinning. In this example, system 100 can include one or more design computers 110, object library 120, one or more object modeler systems 130, one or more object articulation systems 140, one or more object animation systems 150, one or more object simulation systems 160, and one or more object rendering systems 170.

The one or more design computers 110 can include hardware and software elements configured for designing CGI and assisting with computer-aided animation. Each of the one or more design computers 110 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 110 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 110 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 110 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 110 acting as an animator may employ one or more systems or tools to specify motion and position of one or more objects over time to produce an animation.

Object library 120 can include hardware and/or software elements configured for storing and accessing information related to objects used by the one or more design computers 110 during the various stages of a production process to produce CGI and animation. Some examples of object library 120 can include a file, a database, or other storage devices and mechanisms. Object library 120 may be locally accessible to the one or more design computers 110 or hosted by one or more external computer systems.

Some examples of information stored in object library 120 can include an object itself, metadata, object geometry, object topology, rigging, control data, animation data, animation cues, simulation data, texture data, lighting data, shader code, or the like. An object stored in object library 120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 130 can include hardware and/or software elements configured for modeling one or more computer-generated objects. Modeling can include the creating, sculpting, and editing of an object. The one or more object modeling systems 130 may be invoked by or used directly by a user of the one or more design computers 110 and/or automatically invoked by or used by one or more processes associated with the one or more design computers 110. Some examples of software programs embodied as the one or more object modeling systems 130 can include commercially available high-end 3D computer graphics and 3D modeling software packages 3D STUDIO MAX and AUTODESK MAYA produced by Autodesk, Inc. of San Rafael, Calif.

In various embodiments, the one or more object modeling systems 130 may be configured to generated a model to include a description of the shape of an object. The one or more object modeling systems 130 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 130 may further generate model data (e.g., 2D and 3D model data) for use by other elements of system 100 or that can be stored in object library 120. The one or more object modeling systems 130 may be configured to allow a user to associate additional information, metadata, color, lighting, rigging, controls, or the like, with all or a portion of the generated model data.

The one or more object articulation systems 140 can include hardware and/or software elements configured to articulating one or more computer-generated objects. Articulation can include the building or creation of rigs, the rigging of an object, and the editing of rigging. The one or more object articulation systems 140 may be invoked by or used directly by a user of the one or more design computers 110 and/or automatically invoked by or used by one or more processes associated with the one or more design computers 110. Some examples of software programs embodied as the one or more object articulation systems 140 can include commercially available high-end 3D computer graphics and 3D modeling software packages 3D STUDIO MAX and AUTODESK MAYA produced by Autodesk, Inc. of San Rafael, Calif.

In various embodiments, the one or more articulation systems 140 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 140 may further generate articulation data (e.g., data associated with controls or animations variables) for use by other elements of system 100 or that can be stored in object library 120. The one or more object articulation systems 140 may be configured to allow a user to associate additional information, metadata, color, lighting, rigging, controls, or the like, with all or a portion of the generated articulation data.

The one or more object animation systems 150 can include hardware and/or software elements configured for animating one or more computer-generated objects. Animation can include the specification of motion and position of an object over time. The one or more object animation systems 150 may be invoked by or used directly by a user of the one or more design computers 110 and/or automatically invoked by or used by one or more processes associated with the one or more design computers 110. Some examples of software programs embodied as the one or more object animation systems 150 can include commercially available high-end 3D computer graphics and 3D modeling software packages 3D STUDIO MAX and AUTODESK MAYA produced by Autodesk, Inc. of San Rafael, Calif.

In various embodiments, the one or more animation systems 150 may be configured to enable users to manipulate controls or animation variables or utilized character rigging to specify one or more key frames of animation sequence. The one or more animation systems 150 generate intermediary frames based on the one or more key frames. In some embodiments, the one or more animation systems 150 may be configured to enable users to specify animation cues, paths, or the like according to one or more predefined sequences. The one or more animation systems 150 generate frames of the animation based on the animation cues or paths. In further embodiments, the one or more animation systems 150 may be configured to enable users to define animations using one or more animation languages, morphs, deformations, or the like.

The one or more object animations systems 150 may further generate animation data (e.g., inputs associated with controls or animations variables) for use by other elements of system 100 or that can be stored in object library 120. The one or more object animations systems 150 may be configured to allow a user to associate additional information, metadata, color, lighting, rigging, controls, or the like, with all or a portion of the generated animation data.

The one or more object simulation systems 160 can include hardware and/or software elements configured for simulating one or more computer-generated objects. Simulation can include determining motion and position of an object over time in response to one or more simulated forces or conditions. The one or more object simulation systems 160 may be invoked by or used directly by a user of the one or more design computers 110 and/or automatically invoked by or used by one or more processes associated with the one or more design computers 110. Some examples of software programs embodied as the one or more object simulation systems 160 can include commercially available high-end 3D computer graphics and 3D modeling software packages 3D STUDIO MAX and AUTODESK MAYA produced by Autodesk, Inc. of San Rafael, Calif.

In various embodiments, the one or more object simulation systems 160 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 160 may be used to simulate the behavior of objects, such as hair, fur, and cloth, in response to a physics model and/or animation of one or more characters and objects within a computer-generated scene.

The one or more object simulation systems 160 may further generate simulation data (e.g., motion and position of an object over time) for use by other elements of system 100 or that can be stored in object library 120. The generated simulation data may be combined with or used in addition to animation data generated by the one or more object animation systems 150. The one or more object simulation systems 160 may be configured to allow a user to associate additional information, metadata, color, lighting, rigging, controls, or the like, with all or a portion of the generated simulation data.

The one or more object rendering systems 170 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 170 may be invoked by or used directly by a user of the one or more design computers 110 and/or automatically invoked by or used by one or more processes associated with the one or more design computers 110. One example of a software program embodied as the one or more object rendering systems 170 can include PhotoRealistic RenderMan, or PRMan, produced by Pixar Animations Studios of Emeryville, California.

In various embodiments, the one or more object rendering systems 170 can be configured to render one or more objects to produce one or more computer-generated images or a set of images over time that provide an animation. The one or more object rendering systems 170 may generate digital images or raster graphics images.

In various embodiments, a rendered image can be understood in terms of a number of visible features. Some examples of visible features that may be considered by the one or more object rendering systems 170 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air; shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency, diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 170 may further render images (e.g., motion and position of an object over time) for use by other elements of system 100 or that can be stored in object library 120. The one or more object rendering systems 170 may be configured to allow a user to associate additional information or metadata with all or a portion of the rendered image.

In various embodiments, system 100 may include one or more hardware elements and/or software elements, components, tools, or processes, embodied as the one or more design computers 110, object library 120, the one or more object modeler systems 130, the one or more object articulation systems 140, the one or more object animation systems 150, the one or more object simulation systems 160, and/or the one or more object rendering systems 170 that provide one or more tools for efficient elasticity for character skinning Elasticity and Discretization A novel corotational elasticity discretization is disclosed that meets one or more of the demands for high-resolution simulation with optimal performance and robustness. Following [Chao et al. 2010], an accurate treatment of force derivatives is used to yield a more robust solver than those of simplified warped-stiffness techniques. These careful linearizations can be done both cheaply and simply.

In various embodiments, a discretization is performed over a uniform structure (e.g., a hexahedral lattice) rather than an unstructured tetrahedral one to facilitate performance on modern hardware. Whereas most standard methods for hexahedra require 8 point Gauss quadrature per cell for stability, in various embodiments, a one-point quadrature discretization is provided.

Figure 2:
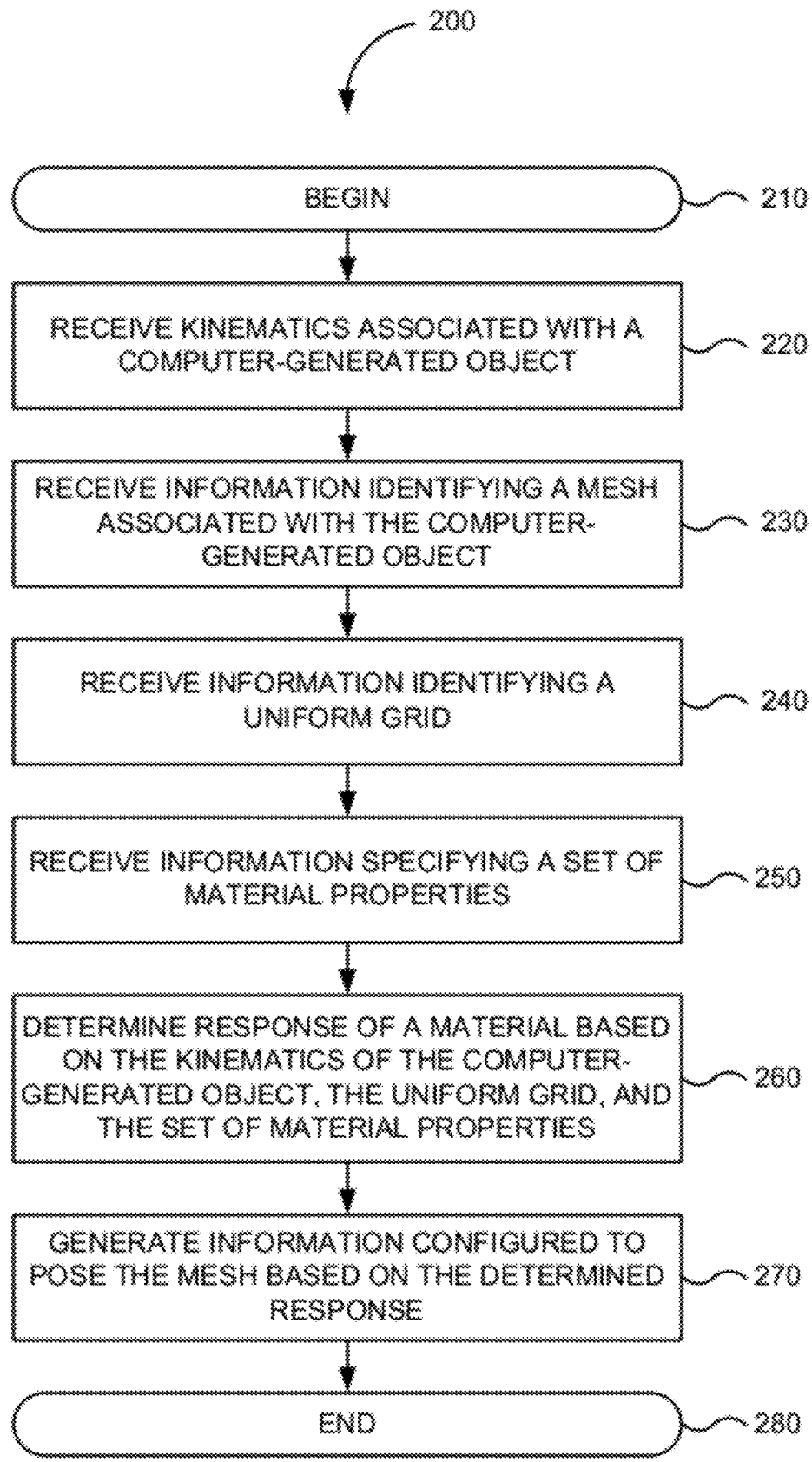
FIG. 2 is a flowchart of a method for character skinning in one embodiment.

FIG. 2 is a flowchart of method 200 for character skinning in one embodiment. Implementations of or processing in method 200 depicted in FIG. 2 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 200 depicted in FIG. 2 begins in step 210.

Figure 3A:
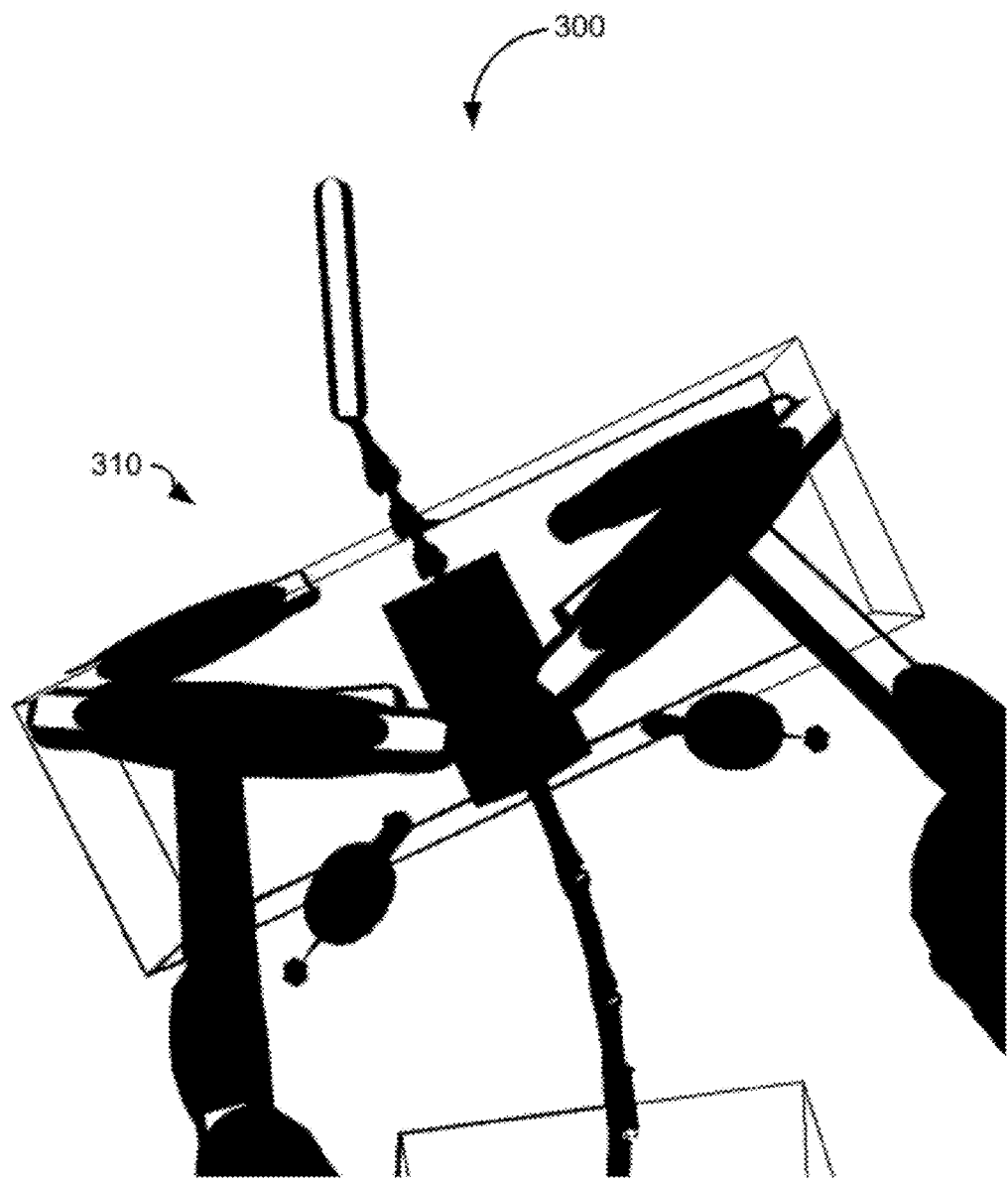
FIG. 3A is an illustration depicting rigging associated with a computer-generated character in one embodiment.

In step 220, kinematics associated with a computer-generated object are received. Some example of the kinematics that are received include motion and position of an object as well as other time-based information. For example, FIG. 3A is an illustration depicting rigging 310 associated with computer-generated character 300 in one embodiment. A user may manipulate one or more elements of rigging 310 to specify the position at keyframes of hands, arms, legs, and other body parts associated with character 300.

In step 230, information identifying a mesh associated with the computer-generated object is received. The mesh may include any number of points, lines, or surfaces. The mesh may further include one or more types of parametric surfaces typically used in CGI modeling, such as NURBS surfaces and subdivision surfaces. In some aspects, the mesh may include a set of control points (also known as control vertices or animation variables) that define the shape of the mesh. As discussed further below, a deformation algorithm ("deformer") is provided to simulate elasticity for character skinning to manipulate control points associated with the mesh.

Figure 3B:
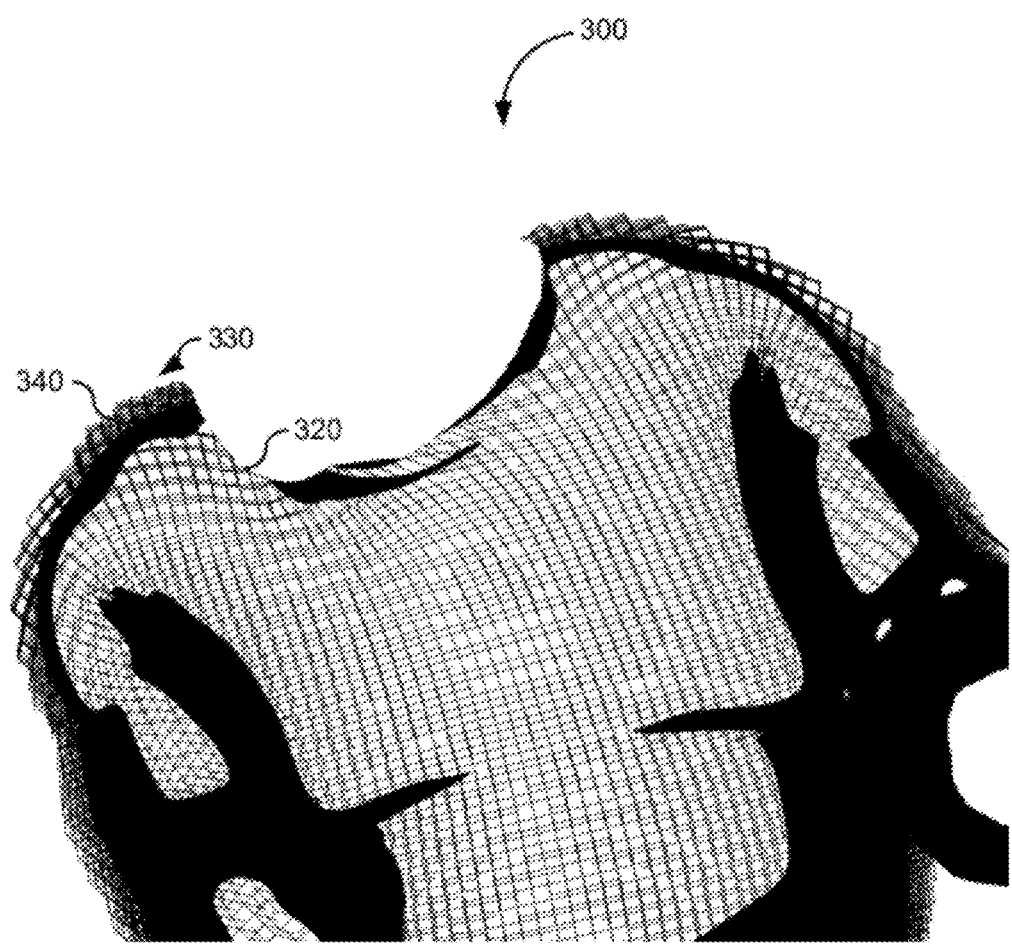
FIG. 3B is an illustration depicting a hexahedral lattice embedding a mesh representing skin of the computer-generated character of FIG. 3A in one embodiment.

In step 240, information identifying a uniform grid is received. The uniform grid can include any number of n-dimensional divisions. For example, the uniform grid may include a polygonal mesh that is partitioned into any number of divisions, such as x, y, and z, and may be referred to as a "lattice." In some embodiments, the uniform grid can include a staggered grid. In various embodiments, the uniform grid or lattice surrounds the mesh associated with the computer-generated character. For example, FIG. 3B is an illustration depicting hexahedral lattice 330 embedding mesh 320 representing skin of character 300 of FIG. 3A in one embodiment. As the user moves elements of rigging 310, a deformer determines how the cells of the lattice are deformed eventually placing all or part of mesh 320 in new locations. A relatively low-resolution lattice can be used to create broad deformation on a high-resolution model. Moreover, although an unstructured lattice may provide more flexibility, the regular grid can provide for economy of storage. For example, storing the topology of a tetrahedral lattice could easily require 4-5 times more than the storage required for the vertex positions, taking up valuable memory bandwidth. Additionally, some transformations and/or operators can be uniform across regular grids, eliminating the need for explicit storage.

In step 250, information is received specifying a set of material properties. The set of material properties define behavior of a continuum representation of a material (e.g., an elastic or plastic material). Some examples of material properties include shape, softness, stiffness, tendency to corrugate, tendency to preserve volume, tendency to compress, as well as other intensive properties and/or extensive properties. Other examples can include parameters that approximate course grain features underlying soft tissues, such as muscles, tendons, veins, and the like. In some embodiments, the set of material properties may be spatially varying. In one example, a user paints material parameters onto a surface mesh which are then extrapolated to the uniform grid. In another example, the set of material properties are associated directly with the uniform grid.

Figure 3C:
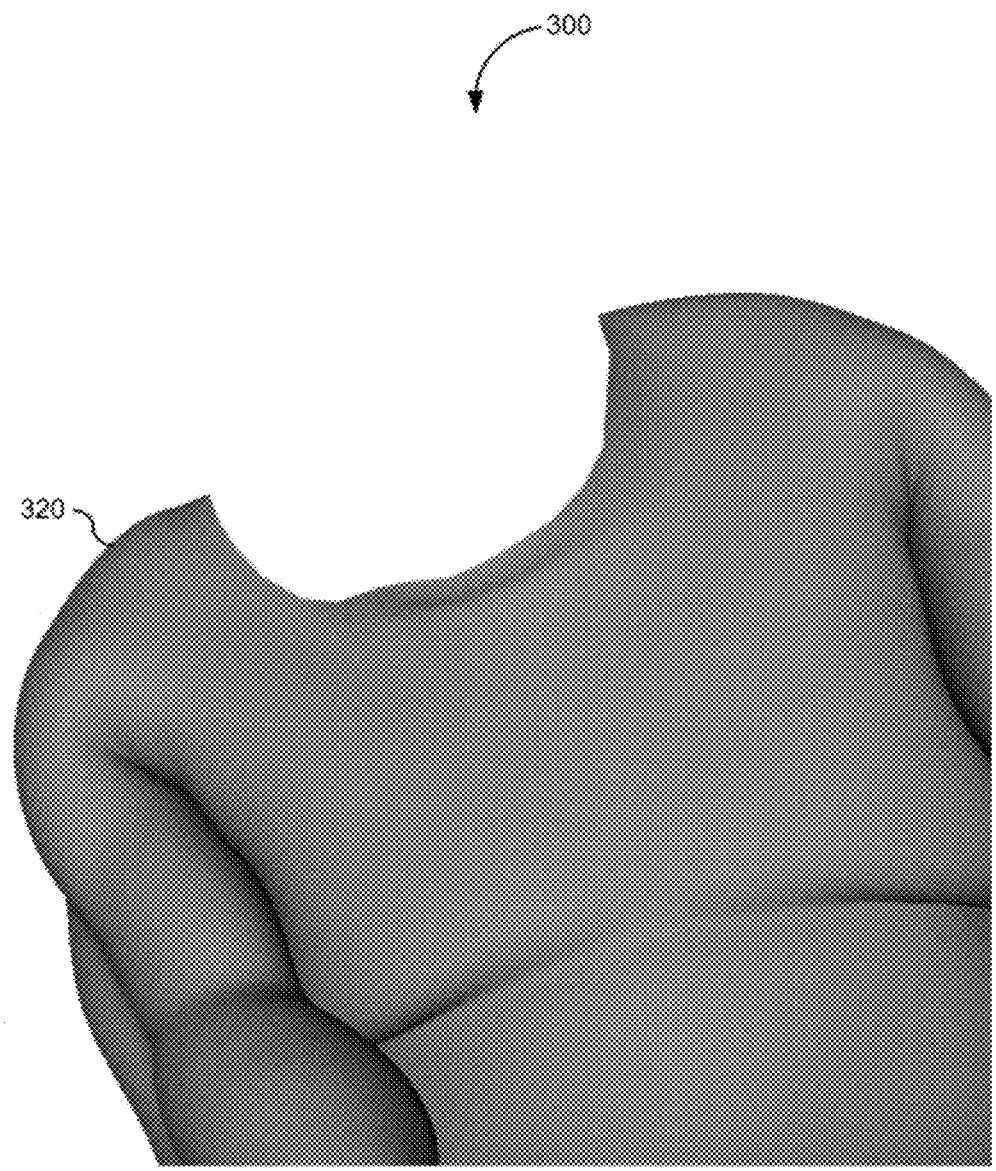
FIG. 3C is an illustration depicting a pose for the mesh representing skin of the computer-generated character of FIG. 3A that may be produced in one embodiment.

In step 260, skin response is determined based on the kinematics of the computer-generated object, the uniform grid, and the set of material properties. For example, system 100 may solve the underlying constitutive equations for a continuum representation of a material to resolve internal and external forces. In step 270, information configured to pose the mesh is generated based on the determined response. In particular, how the cells of the lattice are deformed provide a basis for placing all or part of mesh 320 in new locations. FIG. 3C is an illustration depicting a pose for mesh 320 representing skin of character 300 of FIG. 3A that may be produced in one embodiment. FIG. 2 ends in step 280.

Consider an example of a deformation of a 3D elastic body that is a function $\phi:\Omega \rightarrow R^3$, which maps a material point X to a deformed world-space point x so $x=\phi(X)$. Subsequently, x and $\phi$ may be used interchangeably (i.e., $x(X) \equiv \phi(X)$). For hyperelastic materials in general, the response can be computed based on the deformation energy:

$$E = \int_\Omega \Psi(X, F(X)) dX \qquad (1)$$

Energy density $\Psi$ can be considered as a function of the deformation gradient $F_{ij}=\partial \phi_i / \partial X_j$. Specifically for corotational elasticity, energy density is defined as:

$$\Psi = \mu \|F - R\|_F^2 + \frac{\lambda}{2} tr^2(R^T F - I) \qquad (2)$$

where $\mu$ and $\lambda$ are the Lamé coefficients, and R is the rotation from the polar decomposition F=RS.

In one aspect, the model domain $\Omega$ is discretized into regular (e.g., cubic) elements $\Omega_e$ of step size h so $\Omega = \cup_e \Omega_e$. The degrees of freedom are world space samples of $x_i = \phi(X_i)$. The discrete version of equation (1) then becomes a sum of energies from each element $E_e$.

In one aspect, a single quadrature point may be used to give $E_e$. For example, using just a single quadrature point for the voxel center $p^c$ gives $E_e \approx h^3 \Psi(F^e)$ where $F^e \approx F(p^c)$ is computed with central differences about the cell center from averaged faces.

This approximation can be written as:

$$F_{ij}^e = \sum_k G_{jk}^e x_k^{(i)} \qquad (3)$$

where $x_k^{(i)}$ is the i-th component of the three-dimensional vector $x_k$ and a discrete gradient is provided by:

$$G^e = \frac{1}{4h} \begin{pmatrix} -1 & 1 & -1 & 1 & -1 & 1 & -1 & 1 \\ -1 & -1 & 1 & 1 & -1 & -1 & 1 & 1 \\ -1 & -1 & -1 & -1 & 1 & 1 & 1 & 1 \end{pmatrix}$$

Accordingly, a means is provided to compute the total energy in terms only of the nodal world positions of the regular elements (e.g., a hexahedral lattice) into which the model domain was discretized.

A discrete force per node can in general be provided as:

$$f_i = -\frac{\partial E}{\partial x_i} = \sum_e \left( -\frac{\partial E_e}{\partial x_i} \right) = \sum_e f_i^e \qquad (4)$$

Using equation (3) and the fact that $\Psi$ is a function of the deformation gradient alone, a concise expression for each of the components of $f_e = (f_i^{(1)}, f_i^{(2)}, f_i^{(3)})$ (the force contribution to node i from element e) is:

$$f_i^{(j)} = -\frac{\partial E_e}{\partial x_i^{(j)}} = -V_e \frac{\partial \Psi(F^e)}{\partial x_i^{(j)}} = -V_e \sum_{k,l} \frac{\partial \Psi}{\partial F_{kl}}\bigg|_{F^e} \frac{\partial F_{kl}^e}{\partial x_i^{(j)}} \quad (5)$$

$$= -V_e \sum_{k,l} [P(F^e)]_{kl} G_{li}^e \delta_{jk} = -V_e \sum_l [P(F^e)]_{lj} G_{li}^e$$

$$= -V_e [P(F^e) G^e]_{ji}$$

where $P(F) := \partial \Psi / \partial F$ is the 1st Piola-Kirchhoff stress tensor. For corotational elasticity as defined in equation (2), the 1st Piola-Kirchhoff stress tensor is provided by:

$$P = R[2\mu(S-I) + \lambda tr(S-I)] \quad (6)$$

Combining equation (6) with equation (5), a matrix is provided that maps the nodal positions of an element to its force contribution:

$$f^e = (f_1^e f_2^e \ldots f_8^e) = -V_e P(F^e) G^e \quad (7)$$

At each nodal position $x := (x_1, \ldots, x_8)$, forces $f(x) := (f_1(x_1) \ldots, f_N(x_N))$ are computed in addition to any external forces g. For quasistatics, the resulting force balance equation $f+g=0$ is solved using Newton-Raphson where the k-th iterate requires the solution of the following linearized system:

$$K(x^{(k)}) \delta x^{(k)} = g + f(x^{(k)}) \quad (8)$$

Here, $K(x^{(k)}) := \frac{\partial f}{\partial x}\bigg|_{x^{(k)}}$ and $\delta x^{(k)} := x^{(k+1)} - x^{(k)}$.

Equation (8) is formulated to require solving K at every iteration of a Newton-Raphson solver. However, forming such a matrix explicitly would incur significant performance losses from the 243 non-zero entries needed per node. Instead, in various embodiments, a procedure is defined that directly determines the product $K \delta x = \delta f$ (where $\delta x$ is a displacement), allowing the use of a Krylov solver.

The product $K \delta x = -\delta f$ is the force differential induced by the displacements. Applying differentials on equations (4) and (7), the differential of each nodal force can be provided as $\delta f_i = \Sigma_e \delta f_i^e$ where:

$$(\delta f_1^e \delta f_2^e \ldots \delta f_8^e) = -h^3 \delta[P(F^e)] G^e \quad (9)$$

Taking differentials of $R^T R = I$, $(R^T \delta R)^T + R^T \delta R = 0$ is obtained, thus the matrix $\delta R^T R$ is skew symmetric. Consequently, $tr(\delta R^T F) = tr(\delta R^T RS) = (\delta R^T R):S = 0$ as a contraction of a symmetric and a skew symmetric matrix. Using this result, differentials are taken on equation (6) to obtain:

$$\delta P = 2\mu(\delta F - \delta R) + \lambda\{tr(R^T \delta F) + tr(R^T \delta F)\}R + \quad (10)$$
$$\lambda tr(R^T F - I)\delta R$$
$$= 2\mu \delta F + \lambda tr(R^T \delta F)R + \{\lambda tr(S-I) - 2\mu\}\delta R$$

The differential $\delta F$ of the (discrete, cell-centered) deformation gradient is computed from equation (3) according to the formula:

$$\delta F_{ij}^e = \sum_k G_{jk}^e \delta x_k^{(i)} \quad (11)$$

The differential of rotation R is given by:

$$\delta R = R[\epsilon:((tr(S)I-S)^{-1}(\epsilon^T:(R^T \delta F)))] \quad (12)$$

where $\epsilon$ is the alternating third order tensor which maps a vector to a cross product matrix. Equation (12) is a compact expression of the result presented in [Twigg and Kačić-Alesić 2010], see also Appendix I for a detailed proof.

In summary, for every element or cell $\Omega_e$ in the model domain, system 100 determines a cell-centered deformation gradient $F^e$ using equation (3) and computes its polar decomposition. Using equations (10), (11) and (12), system 100 determines $\delta P$ corresponding to the displacements $\delta x$ using equations (10), (11), and (12). Finally, system 100 determines the contribution of $\Omega_e$ to the force differential using equation (9) and accumulates the determined values onto $\delta f$.

One Point Quadrature Stabilization Method

As discussed above, system 100 provides a discretization of a continuum representation of a material using a single quadrature point per cell. In some aspects, this choice promises better performance since it requires only one singular value decomposition (SVD)/polar decomposition per cell (rather than the 8 required with Gauss quadrature). Unfortunately, this alone can lead to catastrophic defects. In various embodiments, system 100 stabilizes the one point quadrature approach to drastically improves performance by still requiring just one SVD/polar decomposition per cell while also capturing other deformation modes.

Figure 4:
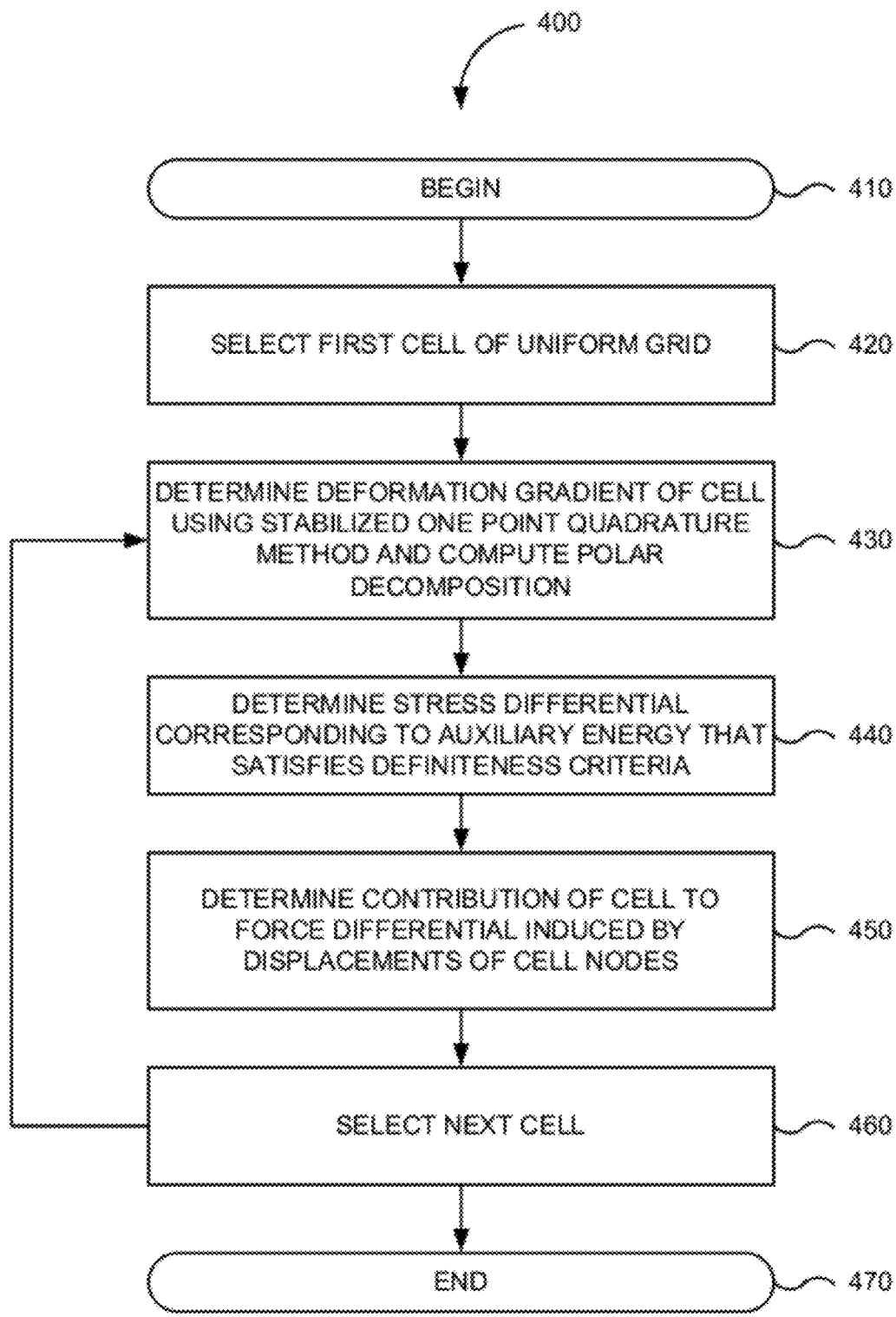
FIG. 4 is a flowchart of a method for determining response of a continuum representation of a material for posing a mesh representing skin of the computer-generated character of FIG. 3A in one embodiment.

FIG. 4 is a flowchart of method 400 for determining response of a continuum representation of material for posing mesh 300 representing skin of character 300 of FIG. 3A in one embodiment. Implementations of or processing in method 400 depicted in FIG. 4 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 400 depicted in FIG. 4 begins in step 410.

In step 420, a first cell of a uniform grid is selected. In step 430, the deformation gradient of the cell is determined using a stabilized one point quadrature method. For example, consider again a cell that has 8 nodal points (24 DOFs). A one-point quadrature based elemental energy that is only dependent on the cell centered deformation gradient (9 DOFs) leads to a large subspace of deformation modes that have no effect on the discrete energy. This "nullspace" might only appear element-by-element and in the union of all elements, these modes would be penalized.

Figure 5:
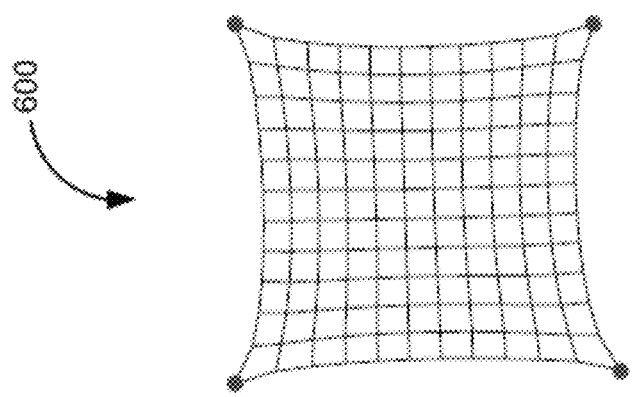
FIG. 5 is an illustration depicting how a red-black ordering of grid nodes using a one point quadrature that is only dependent on the cell centered deformation gradient results in visual artifacts.

Unfortunately, in most cases, there exist nonphysical global modes that have no effect on discrete energy. For example, consider a red-black ordering of grid nodes, and assign one constant displacement to red nodes and another to all black ones. Using a one-point quadrature that is only dependent on the cell centered deformation gradient, such constant displacement will not be seen by the discrete energy but will become visible as parasitic "hourglassing" artifacts in force equilibrium. FIG. 5 is an illustration depicting how the red-black ordering of grid nodes using the one point quadrature that is only dependent on the cell centered deformation gradient results in visual artifacts. Accordingly, these oscillatory nullspace modes are more than visual artifacts, they compromise the ellipticity of the discrete equations in multigrid methods. This is why standard discretizations use higher-order quadrature, gaining stability at higher cost.

Figure 6:
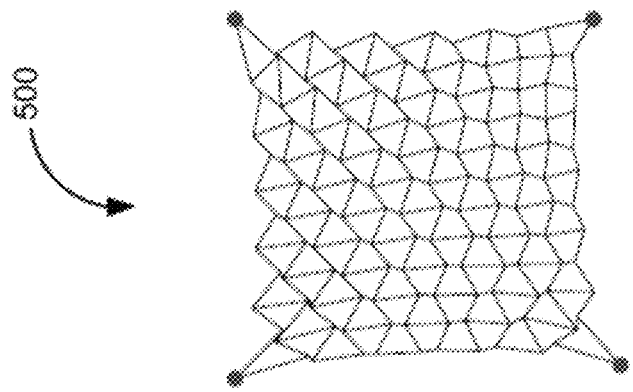
FIG. 6 is an illustration depicting that the red-black ordering of grid nodes using a one point quadrature method that considers other modes does not result in visual artifacts in one embodiment.

To remedy these instabilities, in various embodiments, system 100 incorporates an integration rule that is stable yet computationally cheap (e.g., still requires only one polar decomposition per cell). FIG. 6 is an illustration depicting that the red-black ordering of grid nodes using a stabilized one point quadrature method does not result in visual artifacts in one embodiment. Specifically, the term $\mu\|F-R\|_F^2$ in equation (2) primarily determines stability. If a stable technique (e.g., an 8-point Gauss quadrature) is used to integrate this term, the entire scheme will remain stable, even if a one-point quadrature that is only dependent on the cell centered deformation gradient is used for the term $$\frac{\lambda}{2}tr^2(R^T F - I).$$

Figure 7:
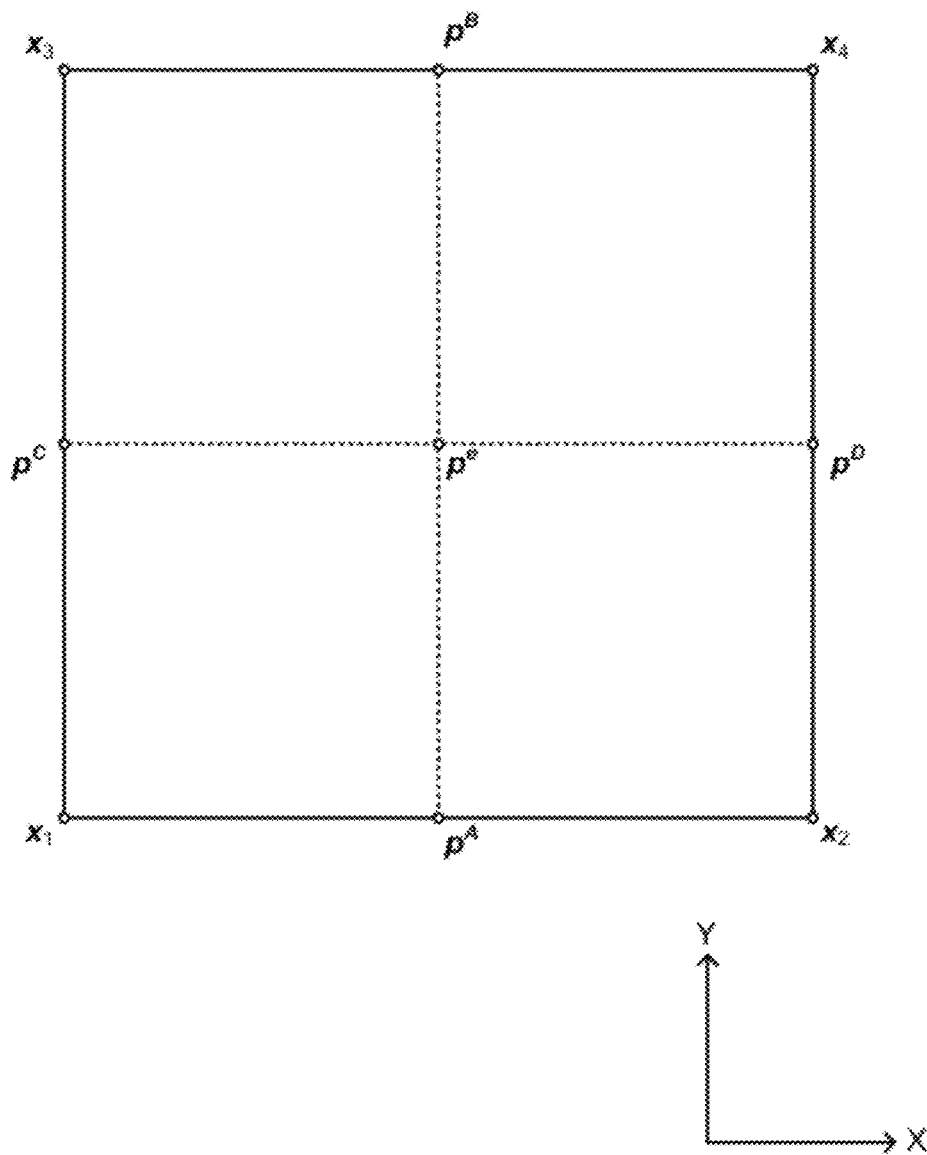
FIG. 7 is an illustration depicting exemplary quadrature points of a lattice cell in 2D in one embodiment.

Consider a 2D case (e.g. a uniform grid having a quadrilateral lattice), using a simpler energy density $\Psi=\mu\|F-R\|_F^2$. The use of staggered grids to avoid instability from non-physical modes when using central differencing can be seen in many Eulerian fluid dynamics methods. [Harlow and Welch 1965] introduced the staggered MAC grid for velocities and pressure, and [Gerritsma 1996; Goktekin et al. 2004] extended this to viscoelastic fluids by staggering the second order stress or strain tensors. Similarly, in this example, in addition to a cell center $p^e$, four additional quadrature points $p^q$, $q \in \{A, B, C, D\}$ are introduced located on edge centers of the quadrilateral lattice. FIG. 7 is an illustration depicting additionally quadrature points of a lattice cell in 2D in one embodiment. The energy is provided by:

$$\Psi = \mu \sum_{i,j}(F_{ij} - R_{ij})^2 \tag{13}$$

In several aspects, a different quadrature rule is followed for every term $(F_{ij}-R_{ij})^2$ in equation (13). In particular, instead of using a single quadrature point $p^e$ at the cell center, system 100 uses those locations within the cell (possibly more than one) where $F_{ij}$ is "naturally" defined, as a central difference of a plurality of degrees of freedom (e.g., a central difference of just two degrees of freedom). In this way, system 100 avoids averaging and risk of cancellation associated with expressing all derivatives exclusively at the cell center.

In FIG. 7, it can be observed that the x-derivatives $F_{11}$ and $F_{21}$ are naturally defined at the centers $p^A$ and $p^B$ of x-oriented edges, while the y-derivatives $F_{12}$ and $F_{22}$ are naturally located at points $p^C$ and $p_D$ of y-oriented edges.

Accordingly, system 100 evaluates the cell-centered deformation gradient $F^e$ following exactly equation (3), determines matrix $R^e$ from the polar decomposition of $F^e$, and uses the information from this matrix wherever $R_{ij}$ is needed in equation (13). Thus, system 100 may implement a quadrature method that takes the form:

$$E_e = \frac{\mu h^2}{2} \sum_{i=1}^{2} \left[ \sum_{q \in \{A,B\}}(F_{i1}^q - R_{i1}^e)^2 + \sum_{q \in \{C,D\}}(F_{i2}^q - R_{i2}^e)^2 \right] \tag{14}$$

Figure 8:
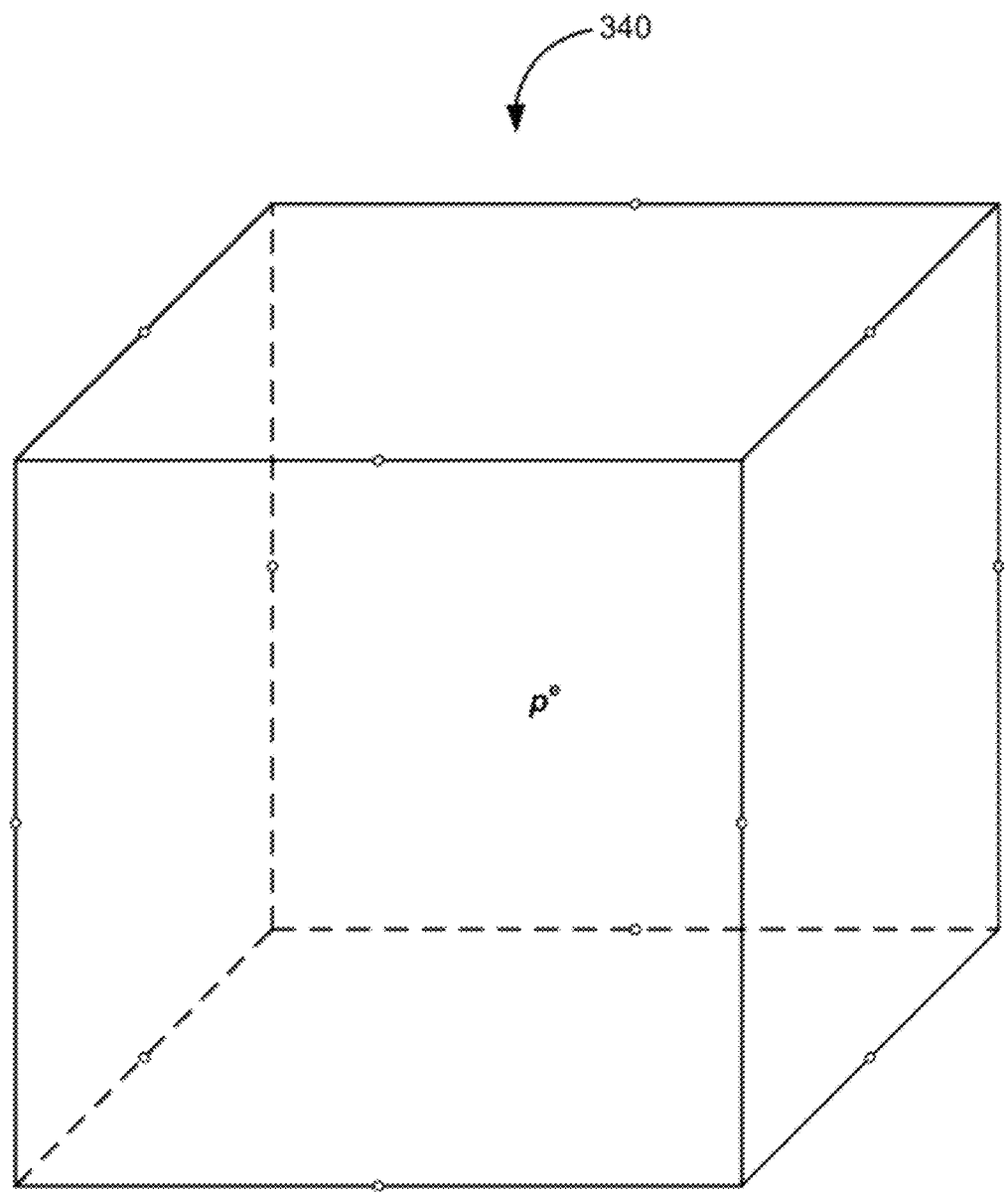
FIG. 8 is an illustration depicting exemplary quadrature points of a lattice cell in 3D in one embodiment.

This can be easily extended to higher dimensions. FIG. 8 is an illustration depicting locations within a lattice cell in 3D where $F_{ijk}$ is "naturally" defined, as a central difference of a plurality of degrees of freedom in one embodiment.

Considering that $$F_{i1}^e = \frac{1}{2}\sum_{q \in \{A,B\}} F_{i1}^q \text{ and } F_{i2}^e = \frac{1}{2}\sum_{q \in \{C,D\}} F_{i2}^q$$

since the entries of $F^e$ were defined as averaged central differences. Using these identities, equation (14) can be transformed into $E_e = E_1 + E_2$, with:

$$E_1 = \frac{\mu h^2}{2} \sum_{i=1}^{2} \left((F_{i1}^A)^2 + (F_{i1}^B)^2 + (F_{i2}^C)^2 + (F_{i2}^D)^2\right), \text{ and} \tag{15}$$

$$E_2 = \mu h^2 \lfloor -2tr(R^{eT}F^e) + \|I\|_F^2 \rfloor \tag{16}$$

The energy discretization suggested by equations (15) and (16) is considered stable.

In order to better explain the mechanics of this approach, the $\mu$-component of the energy can be manipulated as follows:

$$\Psi=\mu\|F-R\|_F^2=\mu\|F\|_F^2-2tr(R^TF)+\|I\|_F^2$$

Equation (15) suggests a quadrature rule for the term $\mu\|F\|_F^2$. The integral $$\frac{1}{2}\int\|F\|_F^2$$

is the weak form of the component-wise Laplace operator; thus equation (15) generates an energy discretization for the Laplace operator $2\mu\Delta$. Equation (16) may be viewed as a one-point quadrature, but on the term $-2tr(R^TF)+\|I\|_F^2$. At this point we can re-introduce the omitted $\lambda$-component of the energy, and write $\Psi$ as:

$$\Psi = \underbrace{\mu\|F\|_F^2}_{\Psi_\Delta} \underbrace{-2\mu tr(R^TF) + \|I\|_F^2 + \frac{\lambda}{2}tr^2(R^TF-I)}_{\Psi_{aux}} \tag{17}$$

Accordingly, system 100 implements a discretization by separating energy, forces, and force differentials into two components: (a) a term stemming from the Laplace energy $\Psi_\Delta$ and (b) an auxiliary term originating from $\Psi_{aux}$, which is integrated with the stable one-point quadrature method. Note that the forces arising from the Laplace term are purely linear, and the stiffness matrix resulting from the same term is constant (and equal to a Laplace matrix), leading to a minimal implementation overhead, over the standard cost of one-point quadrature for the auxiliary term.

Indefiniteness Correction

Symmetry of a stiffness matrix K for many continuum representations of a material allows the use of certain Krylov methods, but positive definiteness is required for conjugate gradients. While K will be positive definite close to equilibrium (it is the energy Hessian), in practice Newton-Raphson iterations may generate intermediate indefinite states. As suggested by [Teran et al. 2005], system 100 modifies K to guarantee definiteness while retaining the same nonlinear solution (though maybe via different iterates).

In various embodiments, system 100 conservatively enforces the definiteness of K by projecting each elemental stiffness matrix to its positive semi-definite counterpart, (i.e., a matrix with the same eigenvectors, but with negative eigenvalues clamped to zero). Naturally it is desirous to avoid an explicit eigenanalysis of the 24×24 elemental stiffness $K^e$ and even forming it at altogether. Thus, in various aspects, system 100 incorporates a procedure to perform this semi-definite projection in an inexpensive, matrix-free fashion.

Consider, initially, the definiteness projection for a simple one-point quadrature rule. The elemental stiffness matrix is positive semi-definite if and only if $0 \leq \delta x^T K^e \delta x = -\delta x^T \delta f$, where $\delta x$ and $\delta f$ are the stacked nodal position and force differentials for $\Omega_e$. Taking differentials on both sides of equation (5) results in:

$$\delta f_i^{(j)} = -V_e \sum_k \delta P_{jk} G_{kl}^e = -V_e T_{jklm} \delta F_{lm}^e G_{ki}^e$$

where $\mathcal{T} = \lfloor T_{ijkl} \rfloor$ is the fourth order tensor defined as the stress derivative $\mathcal{T} := \delta P / \delta F$, or $T_{ijkl} = \delta P_{ij} / \delta F_{kl}$. Therefore, $-\delta x^T \delta f$ can be provided as:

$$-\delta x^T \delta f = -\sum_{i,j} \delta f_i^{(j)} \delta x_i^{(j)}$$

$$= V_e \sum_{j,k,l,m} T_{jklm} \delta F_{lm}^e \sum_i G_{ki}^e \delta_i^{(j)}$$

$$\stackrel{(Eqn.3)}{=} V_e \sum T_{jklm} \delta F_{lm}^e \delta F_{jk}^e$$

$$= V_e (\delta F^e : \mathcal{T} : \delta F^e)$$

Thus, $K^e$ will be positive semi-definite, if and only if the fourth order tensor $\delta P / \delta F$ is positive definite as well (in the sense that $\delta F^e : \mathcal{T} : \delta F^e \geq 0$, for all $\delta F$).

Now, consider a different 4th order tensor $\hat{\mathcal{T}}$ defined by $\delta P = \mathcal{T} : \delta F = R \lfloor \hat{\mathcal{T}} : (R^T \delta F) \rfloor$. Intuitively, if the unrotated differentials are defined as $\delta \hat{P} = R^T \delta P$, and $\delta \hat{F} = R^T \delta F$, then is a tensor that maps $\delta \hat{P} = \hat{\mathcal{T}} : \delta \hat{P}$. Tensors $\mathcal{T}$ and $\hat{\mathcal{T}}$ are a similarity transform of one another. Consequently, they share the same eigenvalues, and performing the indefiniteness fix on one will guarantee the definiteness of the other.

Using this definition and equations (10) and (12), $\delta \hat{P}$ reduces to:

$$\delta \hat{P} = \hat{\mathcal{T}} : \delta \hat{F} = 2\mu \delta \hat{F} + \lambda tr(\delta \hat{F})I + \{\lambda tr(S-I) - 2\mu\} S : \delta \hat{F} \quad (18)$$

where $S = \epsilon \{tr(S)I - S\}^{-1} : \delta^T$. Consider the decomposition of $\delta \hat{F} = \delta \hat{F}_{sym} + \delta \hat{F}_{skew}$ into symmetric $\delta \hat{F}_{sym} = (\delta \hat{F} + \delta \hat{F}^T)/2$ and skew symmetric $\delta \hat{P}_{skew} = (\delta P - \delta \hat{P}^T)/2$ parts and a similar decomposition of $\delta \hat{P} = \delta \hat{P}_{sym} \delta \hat{P}_{skew}$. Collecting symmetric and skew symmetric terms from equation (18) results in:

$$\delta \hat{P}_{sym} = 2\mu \delta \hat{F}_{sym} + \lambda tr(\delta \hat{F}_{sym})I = \mathcal{T}_{sym} : \delta \hat{F}_{sym}, \text{ and} \quad (19)$$

$$\delta \hat{P}_{skew} + 2\mu \delta \hat{F}_{skew} + \{\lambda tr(S-I) - 2\mu\} S : \delta \hat{F}_{skew} = \mathcal{T}_{skew} : \delta \hat{F}_{skew} \quad (20)$$

In essence, $\hat{\mathcal{T}} = \mathcal{T}_{sym} + \mathcal{T}_{skew}$ has a fully decoupled action on the two subspaces of symmetric, and skew symmetric matrices. Since the symmetric and skew subspaces are orthogonal, $\hat{\mathcal{T}}$ will be semi-definite, if and only if its skew and symmetric parts are semi-definite too. The tensor $\mathcal{T}_{sym} = 2\mu I_{sym} + \lambda I \otimes I$ (where $I_{sym}$ is the operator that projects a matrix onto its symmetric part) is always positive semi-definite; thus no modification is necessary. If $I_{skew}$ is the operator that projects a matrix onto its skew symmetric part, then $2I_{skew} = \epsilon : I : \epsilon^T$. Thus, $\mathcal{T}_{skew}$ is written as:

$$\mathcal{T}_{skew} = \mu \epsilon : I : \epsilon^T + \{\lambda tr(S-I) - 2\mu\} [\epsilon : \{tr(S)I - S\}^{-1} : \epsilon^T]$$

$$= \epsilon : L : \epsilon^T, \text{ where } L = \mu I + \{\lambda tr(S-I) - 2\mu\} \{tr(S)I - S\}^{-1}$$

$\epsilon$ is also an orthogonal (although not orthonormal) tensor, thus the definiteness of $\mathcal{T}_{skew}$ is equivalent with the definiteness of the 3×3 symmetric matrix L, which can be easily projected to its positive definite part. Therefore, if the polar decomposition were first computed for the entire SVD $F = U\Sigma V^T$ of the deformation gradient, then $L = V L_D V^T$ where:

$$L_D = \mu I + \{\lambda tr(\Sigma - I) - 2\mu\} \{tr(\Sigma)I - \Sigma\}^{-1}$$

is a diagonal matrix, whose diagonal matrices simply need to be clamped to zero to ensure definiteness for L, for $\mathcal{T}_{skew}$ and ultimately for the entire element stiffness matrix. In one exemplary implementation, system 100 pre-computes and stores the matrix L, projected to its semi-definite component, at the same time when the Polar Decomposition of each element is performed. Then, system 100 successively constructs $\delta \hat{P}_{sym}$ and $\delta \hat{P}_{skew}$ using, for example, equation (19), and ultimately $\delta P = R \delta \hat{P}$.

Thus, system 100 corrects the indefiniteness of the stiffness matrix arising from the (unstable) one-point quadrature technique. In light of the energy decomposition reflected in equation (17), the difference in the discrete energy between the stable and unstable approaches is the discrete quadrature that will be followed to integrate the part $\Psi_\Delta$. In various embodiments, system 100 incorporates the stabilization technique that employs equation (15).

Consider, in two spatial dimensions, if $E_\Delta^S$ and $E_\Delta^U$ are the discrete integral associated with the Laplace term in the stable, and unstable variants respectively, then:

$$E_\Delta^U = \mu h^2 \sum_{i=1}^2 ((F_{i1}^e)^2 + (F_{i2}^e)^2)$$

$$= \mu h^2 \sum_{i=1}^2 \left( \left( \frac{F_{i1}^A + F_{i1}^B}{2} \right)^2 + \left( \frac{F_{i2}^C + F_{i2}^D}{2} \right)^2 \right)$$

$$E_\Delta^U - E_\Delta^S \stackrel{(Eqn.15)}{=} \mu h^2 \sum_{i=1}^2 \left( \left( \frac{F_{i1}^A + F_{i1}^B}{2} \right)^2 + \left( \frac{F_{i2}^C + F_{i2}^D}{2} \right)^2 \right) \geq 0$$

In some aspects, the stable discretization used by system 100 can be interpreted as adding the unconditionally convex term $E_\Delta^U - E_\Delta^S$ to the unstable energy discretization of the single-point approach. The indefiniteness fix described in the context of the unstable method can also be interpreted as augmenting the real stiffness matrix with a supplemental term $K \leftarrow K + K_{supp}$ that guarantees the definiteness of the resulting matrix.

As alluded to above, if the same "definiteness boosting" matrix $K_{supp}$ is added to the stable discretization, definiteness will be guaranteed. Algorithm 1 provides a summary of an exemplary procedure that implements an "auxiliary" stress differential corresponding to the $\Psi_{aux}$ energy component. The differential of the additional force due to the Laplace term $\Psi_\Delta$ are computed as described above.

Algorithm 1 Computation of the stress differential corresponding to the auxiliary energy term $\Psi_{aux}$. Fixed to guarantee definiteness.

```
1: function COMPUTE_L(Σ, V, μ, λ, L)
2:     L_D ← {λtr(Σ-I)-2μ} {tr(Σ)I-Σ}^-1
3:     Clamp diagonal elements of L_D to a minimum value
4:         of (-μ)         » Term Ψ_A will boost this eigenvalue by μ
5:     L ← VL_D V^T
6: end function
7: function DPAUXDEFINITEFIX( δF , R, L)
8:     δF̂_sym ← SymmetricPart(R^T δF)
9:     δF̂_skew ← SkewSymmetricPart(R^T δF)
10:    δP̂_sym ← λtr(δF̂_sym)I
11:    δP̂_skew ← ε : {L(ε^T : δP̂_skew)}
12:    δP̂_aux ← R(δP̂_sym + δP̂_skew)
13:    return δP_aux
14: end function
```

Returning to FIG. 4, in step 440, a stress differential corresponding to an auxiliary energy is determined that satisfies definitness criteria. For example, system 100 determines $\delta\hat{P}_{aux}$. In step 450, the contribution of the cell to the force differential induced by displacements of the cell nodes is determined. For example, system 100 determines the contribution of $\Omega_e$ to the force differential and accumulates the determined values onto δf. In step 460, the next cell is selected. FIG. 4 ends in step 470.

Although the above formulations provide the benefit of a symmetric and definite linear system in every Newton iteration, it is noted that the force differentials thus produced are not identical to the exact expressions from equations (9) and (10) (also described in [Chao et al. 2010]). Since the lesser accuracy of the warped stiffness procedure, or the approach of [Zhu et al. 2010], motivated the use of proper force differentiation, it is beneficial to assess the magnitude of inaccuracy that any such definiteness correction incurs. The disclosed method, as well as the aforementioned approximations effectively amount to a Modified Newton procedure for the force equilibrium equation. Notably, all methods reach the same equilibrium solution if converged; they simply follow different search paths towards that solution. From the theory of modified Newton methods, the convergence properties of the modified procedure depend on the spectral radius $Q=\rho(I-\hat{J}^{-1}J)$, where J is the proper force Jacobian, and $\hat{J}$ is the approximation used. If Q<1Q<1, the modified procedure is convergent (in fact, when Q≪1, quadratic convergence is practically retained); however when Q>1 there is no guarantee of convergence, and certain error modes exist that will be amplified by the modified iteration.

Figure 9:
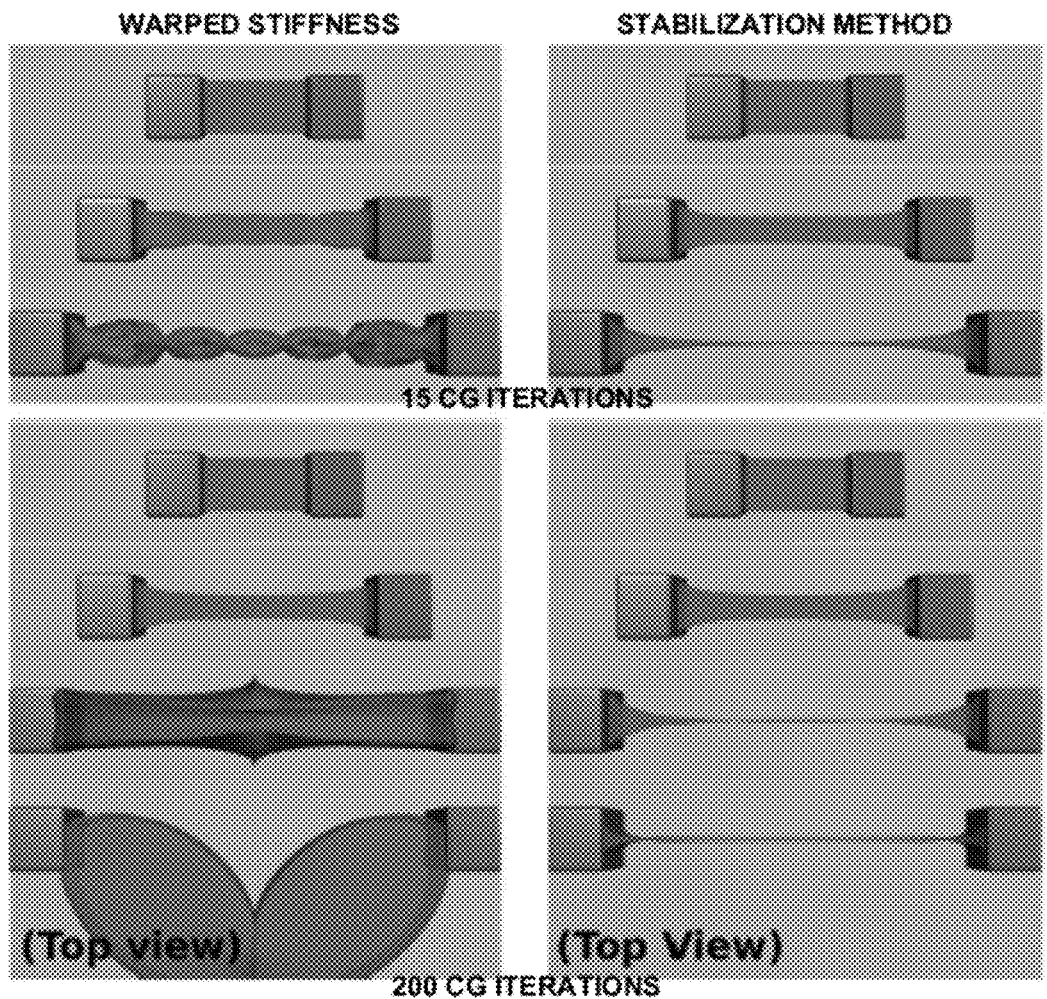
FIG. 9 is an illustration depicting a comparison between inexact methods of computing force differentials that lead to instabilities and a deformer incorporating the disclosed techniques.

For warped stiffness $\hat{J}$ results from the approximation of the stress differential of equation (10) by the simpler expression $\delta P=R\{\mu\lfloor(R^T \delta F)+R^T \delta F)^T\rfloor+\lambda tr(R^T \delta F)\}$. The formulation of [Zhu et al. 2010] implies a similar approximation, namely $\delta P=R\{2\mu(R^T \delta F)+\lambda tr(R^T\delta F)\}$. The spectral radius Q corresponding to all three approaches remains relatively close to zero (<0.05) for deformations that are small and smooth. However, the disclosed stabilization method remains safely convergent, significantly more so than the other two alternatives, even with larger, non-smooth deformations. For example, in the scenario of FIG. 9, at the moment when warped stiffness develops an instability during a 2.4× extension or stretch, Q=4.87 for warped stiffness, Q=0.829 for the approximation of [Zhu et al. 2010], and Q=0.0717 for the disclosed stabilization method. Thus, inexact methods of computing force differentials lead to instabilities, even with moderate Poisson's ratio (e.g., 0.3). In this example, instabilities occur at 2.4× stretch, which is common near joints in skinning applications.

Dynamics

In further embodiments, system 100 provides for dynamic simulations that include inertial effects. However, it is important to note that the indefiniteness encountered in quasistatic time stepping also arises in implicit time stepping for dynamics. System 100 further incorporates the definiteness fix outlined above for use in dynamics as well.

Idefiniteness is increasingly likely to occur when performing interactive high-resolution simulation. In these cases, a fixed, large time step of $$\Delta t \approx \frac{1}{30}$$

is typically desired (e.g., to take as few timesteps as possible). In one illustration, using backward Euler time stepping and Newton-Raphson linearization, the following update equation must be solved for the increment δx in the $k^{th}$ iteration:

$$K^{BE}(x_k^{n+1})\delta x=\Delta tM[v^n+\Delta t(x^n-x_k^{n+1})]+\Delta tf(x_k^{n+1})$$

In this example, $K^{BE}=M+\Delta t^2K(x_k^{n+1})$, and M is the mass matrix. The indefiniteness of $K(x_k^{n+1})$ can thus be seen to potentially cause indefiniteness of $K^{BE}(x_k^{n+1})$. One could attempt to manipulate nodal masses or material properties to preserve definiteness, but this alters the behavior of the simulation in arbitrary ways. Although decreasing the timestep could also fix the indefiniteness, the time step cannot be decreased arbitrarily when interactivity is desired. Furthermore, it is important to note that the nodal mass is proportionate to the volume associated with each node. Therefore, as the discrete spatial resolution of the domain increases, the nodal mass decreases thereby increasing the likelihood of encountering an indefinite backward Euler system matrix as it would behave more and more like the indefinite $K(x_k^{n+1})$.

Figure 10:
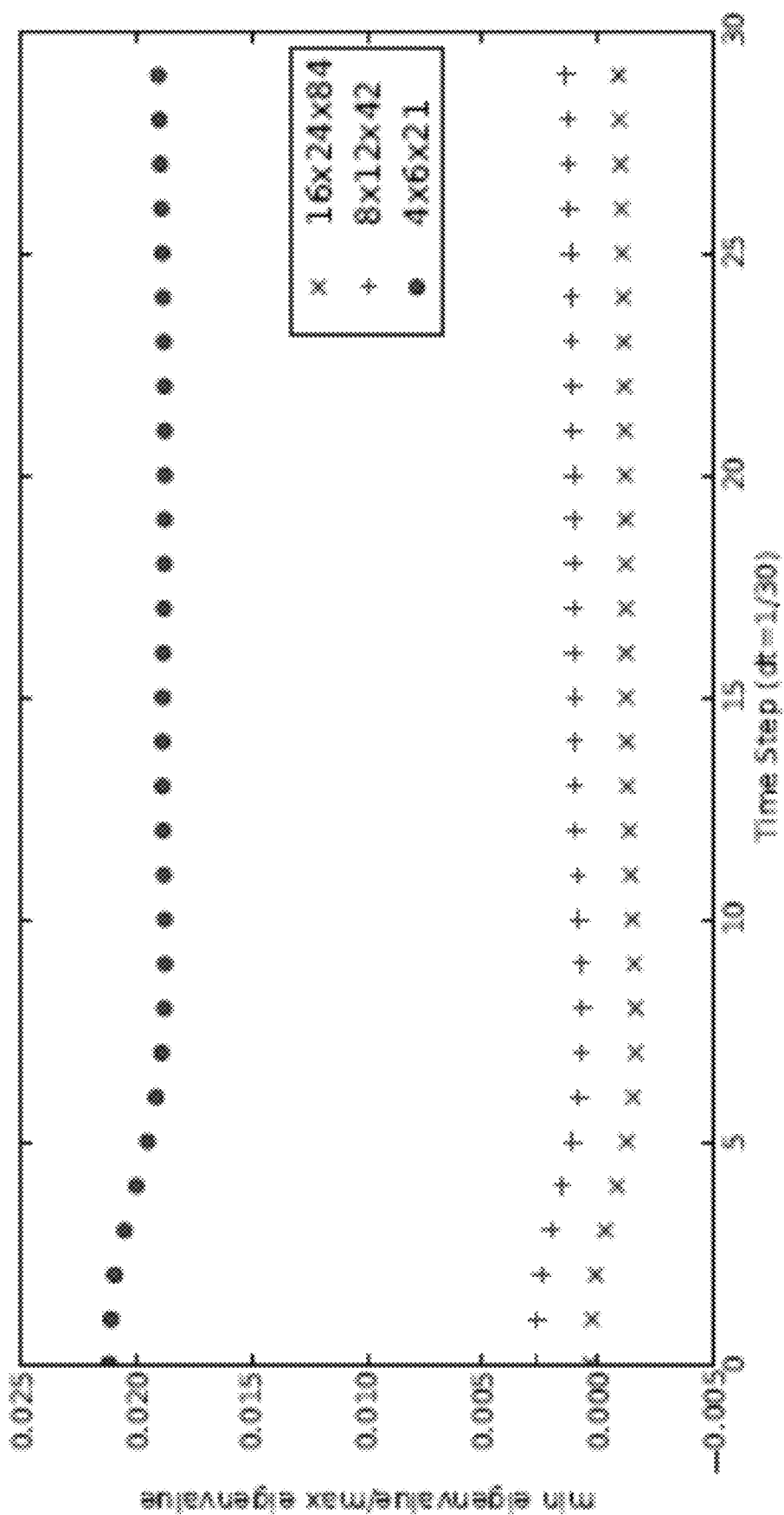
FIG. 10 is a graph illustrating results of a numerical experiment in one embodiment.

FIG. 10 illustrates results of a numerical experiment that demonstrates this behavior. In this example, plot of ratios of minimum to maximum eigenvalues of the backward Euler matrix of a dynamic elastic bar simulation without the disclosed definiteness fix applied. Note that the minimum eigenvalues are negative in the 16×24×84 resolution example. Therefore, when both high performance and high resolution are desired, indefiniteness in the backward Euler system matrix is quite likely. Fortunately, the definiteness fix for $K(x_k^{n+1})$ guarantees definiteness of the backward Euler system matrix.

Constraints and Collisions

In further embodiments, system 100 provides the ability to handle elaborate collisions. In one aspect, point constraints are provided to enforce both soft constraints, such as bone attachments, and to handle object and self collisions. Specifically, proxy points $(x_p)$ are embedded in simulation lattices and their associated forces are distributed (e.g., trilinearly) to the vertices of the regular grid cells (e.g., hexahedron) that contain them. [Sifakis et al. 2007] show the effectiveness of this basic approach.

Figure 12:
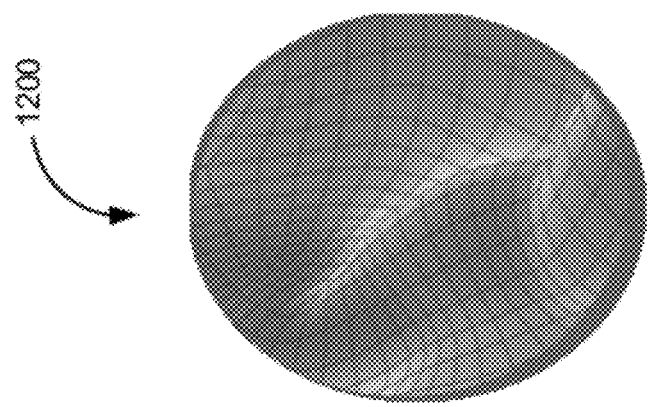
FIG. 12 is an illustration depicting how a coupling between elasticity and collisions produces more natural results in one embodiment.
Figure 11:
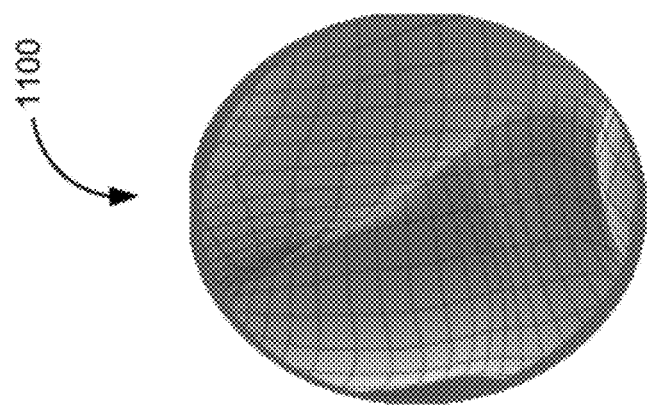
FIG. 11 is an illustration depicting how a decoupling between elasticity and collisions results in visual artifacts.

FIG. 11 is an illustration depicting how a decoupling between elasticity and collisions results in visual artifacts. In this example, a production rig qualitatively exhibits the right look but does not resolve collisions. FIG. 12 is an illustration depicting how a coupling between elasticity and collisions produces more natural results in one embodiment. In this example, resolving self-collisions produces a much more natural look.

In another aspect, system 100 determines collision response by a number of collision proxies. For example, collision proxies are placed approximately covering an embedded collision surface. In one embodiment, system 100 utilizes a penalty based response dependent on the penetration depth and unit outward normal at each proxy point. For rigid objects, system 100 queries a level set representation of an object at each proxy point. However, for self-collision, the rapidly changing shape of elastic objects precludes accurate reconstruction of a signed distance function at each time step.

Accordingly, for each proxy collision point, system 100 first determine which deformed hexahedron contains the proxy collision point in the current configuration. In one embodiment, system 100 performs this rapidly by querying an axis aligned bounding box hierarchy whose leaves surround each deformed cell in the current configuration. To prevent false positives, system 100 does not look in the 27 hexahedron in the one ring of the proxy point in material coordinates. Each hexahedron deemed near a given proxy point is then tetrahedralized to barycentrically determine the proxy point's material location. For each material point, system 100 then queries a level set stored in the undeformed configuration: $\phi_0$. If there are multiple negative $\phi_0$ values, system 100 uses the location with $\phi_0$ closest to zero to compute the closest point on the undeformed surface. System 100 then looks up the deformed position of the closest surface point ($x_s$) to estimate the penetration depth as $|x_s-x_p|$ and outward unit normal as $$n=(x_s-x_p)/|x_s-x_p|.$$

In a further aspect, for both self-collision and solid object collision scenarios, system 100 instantiates a zero rest-length spring from the proxy point to the closest point on the surface. The Young's modulus of this spring is allowed to be anisotropic in the direction of the unit collision normal. Specifically, the spring force arises from the energy $$\Psi(x_p,x_s)=k(x_p-x_s)^T M(x_p-x_s)/2 \text{ where } M=(1-\alpha)nn^T+\alpha I, \text{ with } \alpha\in[0,1]. \alpha=1$$

corresponds with a traditional isotropic spring; $\alpha=0$ results in a standard point repulsion. This anisotropic conception of the stiffness allows for sliding in the plane orthogonal to the penetration direction. In practice, the inventors have found $\alpha\in[0.1,0.5]$ worked best for self collisions and $\alpha=0$ was sufficient for object collisions.

Multigrid

Figure 13:
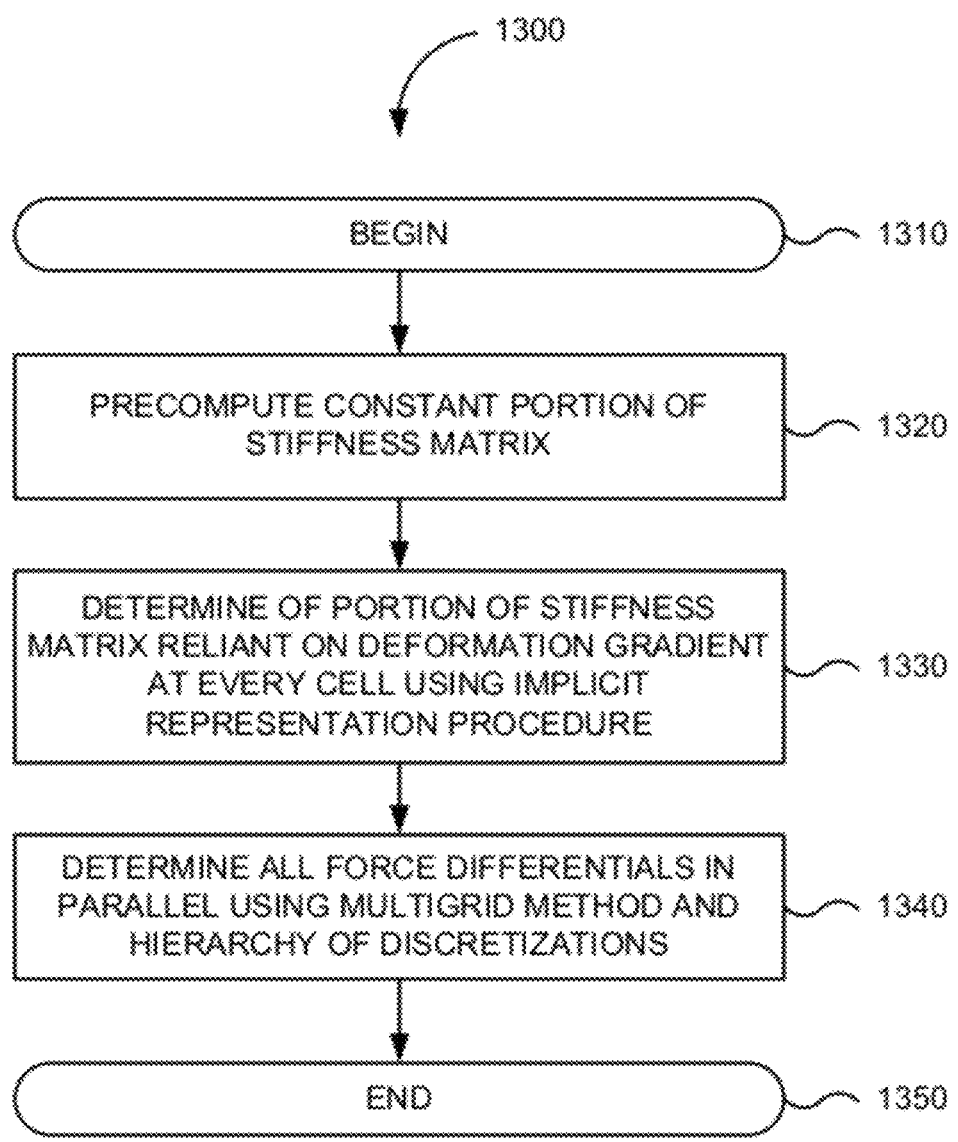
FIG. 13 is a flowchart of a method for solving equations of elasticity using a multigrid method and a matrix free formulation of portions of the stiffness matrix.

In still further embodiments, to ensure that techniques described herein scale to high resolutions, system 100 solves equations of elasticity using a multigrid technique. FIG. 13 is a flowchart of method 1300 for solving equations of elasticity using a multigrid method and a matrix free formulation of portions of the stiffness matrix. Implementations of or processing in method 1300 depicted in FIG. 13 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1300 depicted in FIG. 13 begins in step 1310.

In step 1320, a constant portion of a stiffness matrix is precomputed. For example, system 100 the part $K_A$ of the stiffness matrix due to $\Psi_A$, which is not dependent on positions. In step 1330, a portion of the stiffness matrix reliant on the deformation gradient at every cell is determined using an implicit representation procedure. For example, the auxiliary part $K_{aux}$ due to $\Psi_{aux}$ is fully determined by the discrete deformation gradient $F^e$ at every cell. Thus, whenever information is required from the stiffness matrix, system 100 obtain the relevant portions either from the precomputed constant portion or via the implicit representation procedure fully determined by the discrete deformation gradient $F^e$ at every cell.

In step 1340, all force differentials are determined in parallel using a multigrid method and a hierarchy of discretizations. This may be accomplished using at least one of the two following approaches: the first option is to construct a multigrid cycle purely as a solver for the linear system (8) generated in every Newton-Raphson step. The other possibility is to implement a fully nonlinear multigrid cycle, based on the Full Approximation Scheme (FAS) which would replace and accelerate the entire sequence of Newton iterations.

As discussed above, system 100 provides a discretization based on a voxelized representation of an elastic body. At any given resolution, for example, a cubic background lattice is defined and its cells are labeled either internal or external depending on any material overlap with an embedded deforming body. Internal cells can optionally be labeled as constrained (or Dirichlet) if the trajectories of their nodes will be specified as hard kinematic constraints. The Lame coefficients $\mu$ and $\lambda$ can be specified for each individual cell, allowing for inhomogeneous models. The coarser domains of a multigrid hierarchy can be generated, for example, by using a simple binary coarsening strategy. Similar to [Zhu et al. 2010], a label of constrained, internal or external is assigned in this order of priority, if fine children with more than one type are present. The Lame parameters of coarse interior cells are computed by summing the $\mu$ and $\lambda$ of any interior children, and dividing by eight; thus coarse cells overlapping with the boundary receive lower material parameters, to account for the partial material coverage of the cell.

In general, a multigrid method requires system 100 to generate a hierarchy of discretizations. Specifically, if system 100 uses a multigrid to solve the linear system (8), different versions of K, denoted by $K^h$, $K^{2h}$, $K^{4h}$, . . . need to be computed for every level of the multigrid hierarchy. The Galerkin coarsening strategy is avoided since it requires forming the stiffness matrices explicitly. In several embodiments, system 100 incorporates an alternative matrix-free approach which constructs $K^{2h}$ from a re-discretization at the coarse grid. System 100 can then repeat the same process followed at the fine grid, and define coarse forces $f^{2h}(x^{2h})=-\partial\Psi^{2h}/\partial x^{2h}$ as well as a coarse stiffness $K^{2h}=\partial f^{2h}/\partial x^{2h}$ and encode these in a matrix-free fashion as before.

One challenge however is that the entries in $K^{2h}$ depend on the current estimate of the solution and, more accurately, on a coarse grid version $x^{2h}$ of this estimate. The general methodology is to define yet another restriction operator R (possibly different than the R used to restrict residuals) to downsample the solution estimate as $x^{2h}=\hat{R}x^h$. However, as a consequence of the geometric domain coarsening described above, the discrete domain grows in size, as coarse cells with any interior children will now be considered fully interior, even if they include some exterior cells from the fine grid. Therefore, restricting the approximation $x^h$ would require extrapolation of the deformation field. Such extrapolations are usually quite unstable, especially in the presence of collisions, and sometimes even ill-defined near concave, high curvature boundaries.

It has been observed that the entries of K do not depend directly on the positions x, but only through the deformation gradient F. Note that this is also true for the stabilized discretization discussed above; the part $K_A$ of the stiffness matrix due to $\Psi_A$ is a constant matrix, not dependent on positions at all. The auxiliary part $K_{aux}$ due to $\Psi_{aux}$ is fully determined by the discrete deformation gradient $F^e$ at every cell. Thus, instead of restricting $x^h \rightarrow X^{2h}$, system 100 instead downsamples the deformation gradient as $F^h \to F^{2h}$, which may be done in one example with simple weighted averaging. Once the stiffness matrices have been constructed for all levels, system 100 uses the V-Cycle described in Algorithm 2 to solve the linearized Newton equation. The transfer operators R and P are constructed based on trilinear interpolation. Since system 100 does not explicitly construct K, system 100 use a Jacobi smoother instead of a Gauss-Seidel one, since for the Jacobi procedure all force differentials may be computed in parallel. Note however that the elasticity matrix is not diagonally dominant, and the Jacobi procedure needs to be damped for stable convergence. The inventors have found that the damping coefficient could safely be as high as 0.8 in the interior of the object, while values of 0.3-0.4 were more appropriate near the boundary, near soft constraints, and for higher values of Poisson's ratio.

---

Algorithm 2 Linear Multigrid V(1,1) Cycle for equation (8).

---

1: procedure LinearVCycle
2:      $b^h \leftarrow f^h(x^h) + g^h$
3:      for l = 0 to L−1 do          ▷ total of L+1 levels
4:          Smooth($K^{2^l h}$, $\delta x^{2^l h}$, $b^{2^l h}$)
5:          $r^{2^l h} \leftarrow b^{2^l h} - K^{2^l h} \delta x^{2^l h}$
6:          $b^{2^{l+1} h} \leftarrow$ Restrict($r^{2^l h}$), $\delta x^{2^{l+1} h} \leftarrow 0$
7:      end for
8:      Solve $\delta x^{2^L h} \leftarrow (K^{2^L h})^{-1} b^{2^L h}$
9:      for l = 0 to L−1 do
10:          $\delta x^{2^l h} \leftarrow \delta x^{2^l h} +$ Prolongate($\delta x^{2^{l+1} h}$)
11:          Smooth($K^{2^l h}$, $\delta x^{2^l h}$, $b^{2^l h}$)
12:      end for
13: end function

---

In some aspects, system 100 copies each soft constraint and active collision proxy to the coarse grids based on its material location. System 100 then scales its associated stiffness modulus by a predetermined factor (e.g., 0.125 in 3D or 0.25 in 2D) to accommodate its embedding in a larger element. Otherwise, system 100 treats the coarsened proxies in the same manner at every level of the hierarchy.

In further embodiments, system 100 implements a fully nonlinear multigrid solver, based on the Full Approximation Scheme (FAS) approach. As before, the challenge is that the nonlinear force operator requires a coarse grid version of the solution estimate. Once again, the operator only depends on x through the deformation gradient; unfortunately the deformation gradient does not stay fixed through smoothing and v-cycles, requiring constant updates. System 100 considers the restricted value of the deformation gradient as an "offset" (denoted by $F_{off}$) and changes the state variables for the coarser grids from positions (x) to corrections (u) from this offset. System 100 then computes the updated deformation as $F = F_{off} + G[u]$, where G is the cell-centered gradient operator. The nonlinear forces computed based on this updated gradient are $f^h(F_{off}^h; u^h)$. System 100 incorporates the FAS procedure outlined in Algorithm 3. Damped Jacobi is used, albeit with re-linearization steps inserted between every 2-3 Jacobi iterations.

---

Algorithm 3 FAS V-Cycle for nonlinear equilibrium equation.

---

1: procedure FASVCycle( $f^h(F_{off}^h; u^h) + g^h = 0$)
2:      NonLinearSmooth( $f^h(F_{off}^h; u^h) + g^h = 0$)
3:      $F_{off}^{2h} \leftarrow \hat{R}(F_{off}^h + G^h[u^h]), u^{2h} \leftarrow 0$
4:      $g^{2h} \leftarrow -f^{2h}(F_{off}^{2h}; u^{2h}) + R(f^h(F_{off}^h; u^h) + g^h)$
5:      Solve( $f^{2h}(F_{off}^{2h}; u^{2h}) + g^{2h} = 0$)      ▷ By recursive call

---

Algorithm 3 FAS V-Cycle for nonlinear equilibrium equation.

---

6:      $u^h += $ Prolongate($u^{2h}$)
7:      NonLinearSmooth( $f^h(F_{off}^h; u^h) + g^h = 0$)
8: end function

---

FIG. 13 ends in step 1350.

Optimizations

In one aspect, a very significant source of optimization is the choice of initial guess as iterative methods are used. To make solutions deterministic and completely frame independent, use of a base linear blend skin as an initial guess is contemplated. However, this can lead to unstable behavior in the presence of large contact deformations since the way collisions are resolved in general depends on the path taken to the colliding state. Instead, the previous solution (often the previous frame) can be used as an initial guess (and is in some embodiments).

In various embodiments, to improve performance on a CPU, multithreading using a task queue was implemented. Access patterns can be designed to be cache friendly by using blocking techniques. SSE data level parallelism can also be exploited for any SVD computation. Additionally, templatization can be used to optimize stride multiplication computations in array accesses. Constraint contributions to the matrix were baked into a structure that minimized indirection. In further embodiments, since GPUs have become popular for parallel numerical algorithms, all or part of any CPU oriented code to a GPU. Some examples include grid optimization techniques of [Dick et al. 2011].

As discussed above, the Jacobi iteration used as the smoother in the multigrid scheme requires explicit knowledge of the diagonal part of the stiffness matrix K. A specialized process needs to be followed to compute the diagonal part directly and efficiently such that system 100 never construct this matrix explicitly. A high-level description is provide here, and Appendix I provides a detailed algebraic derivation.

Specifically, for element $\Omega_e$, the contribution of each of the 24 degrees of freedom to the diagonal part of K is explicitly defined. In particular, a degree of freedom $x_i^{(j)}$, that is the j-th component of the i-th element vertex, 502 where $i \in \{1, \ldots, 8\}$. Also, g is defined to be the i-th column of the discrete gradient G, and $r^T$ the j-th row of R. $M_i = \epsilon : g$ (i.e. the right-side cross product matrix with g) and $N_i = \lambda gg + M_i^T L M_i$, where L was defined as above. The diagonal contribution of $\Omega_e$ to the diagonal part corresponding to degree of freedom $x_i^{(j)}$ is $$\frac{3}{2}\lambda / h^2 + r^T N_i r.$$

The diagonal entries corresponding to antidiametric vertices (e.g. $x_1$ and $X_8$) are equal; thus system 100 only computes the diagonal entry for the components of 4 out of the 8 vertices of the element. Finally, $N_i$ can be precomputed, and system 100 only needs to consider $i = 1, \ldots, 4$, as matrices are identical for all elements.

In some embodiments, system 100 makes use of the Singular Value Decomposition $F = U\Sigma V^T$ to define the matrix L. In one embodiment, system 100 uses it to construct the rotational factor of the Polar Decomposition as well, as $R = UV^T$. The cost of the 3×3 SVD is commonly acknowledged as a bottleneck for corotational or shape matching methods. Therefore, system 100 incorporates highly efficient methodologies which are virtually branch free (other than the use of conditional assignments, which is an atomic instruction in SSE4.1 and other platforms), uses no expensive arithmetic other than addition, subtraction, multiplication and an inexact square root (i.e. the SSE VRSQRTPS instruction), and is trivially and extensively vectorizable. The inventors have obtained a cost per decomposition equal to 11 ns on a 12-core X5650 workstation, using SSE and multithreading in conjunction. This cost is about 1/40 of recently reported results [Rivers and James 2007], and we require the exact same computation for any matrix, without counting on warm starts for acceleration.

The core cost of the SVD analysis is commonly reported to be the symmetric eigenanalysis. An iterative Jacobi diagonalization procedure is often used to bring the symmetric matrix $S=F^T F$ into diagonal form. Instead of the exact Givens conjugation used in the Jacobi procedure, an approximate Givens angle is defined which can be obtained with minimal computation. The optimal Givens angle that annihilates element $s_{21}$, for example is known to satisfy $\tan(2\theta)=2s_{12}/(s_{11}-s_{22})$. Instead of using an inverse trigonometric function (or the alternative approach of solving a quadratic equation), the following asymptotic approximation, valid when $\theta$ is small, is considered:

$$\frac{2s_{12}}{s_{11}-s_{22}} = \tan(2\theta) \approx 4\tan\left(\frac{\theta}{2}\right) \Rightarrow \frac{\sin(\theta/2)}{\cos(\theta/2)} \approx \frac{s_{12}}{2(s_{11}-s_{22})}$$

At this point, this approximate rotation can be stored as the un-normalized quaternion $(2(s_{11}-s_{22}), 0, 0, s_{12})$, eliminating the need for divisions or exact normalizations. In fact, an inexact normalization can be performed using the approximate VRSQRTPS SSE instruction, merely for the purpose of avoiding overflow, and without this inaccuracy affecting the semantics of the quaternion. However, the asymptotic approximation does not hold for arbitrary $\theta$, and it would be possible that the off-diagonal element would not be reduced (let alone, annihilated) for certain cases. However, either the above approximation or a choice of $\theta=\pi/4$ is guaranteed to reduce the magnitude of the off diagonal element $s_{12}$ by at least a factor of 0.6 per application. Deciding which one to use is made with a simple algebraic check, as shown in Algorithm 4

---
Algorithm 4 Computation of approximate Givens quaternion.
---

1: const $\gamma \leftarrow 3 + 2\sqrt{2}$, $c^* \leftarrow \cos(\pi/8)$, $s^* \leftarrow \sin(\pi/8)$
2: function ApproxGivensQuaternion($a_{11}$, $a_{12}$, $a_{22}$)
3:    $c_h \leftarrow 2(a_{11} - a_{22})$      » $c_h \approx \cos(\theta/2)$
4:    $s_h \leftarrow a_{12}$      » $s_h \approx \sin(\theta/2)$
5:    $b \leftarrow \lfloor \gamma s_h^2 < c_h^2 \rfloor$      » b is boolean
6:    $w \leftarrow \text{RSQRT}(c_h^2 + s_h^2)$      » $\text{RSQT}(x) \approx 1/\sqrt{x}$
7:    $c_h \leftarrow b \,?\, wc_h : c^*$
8:    $s_h \leftarrow b \,?\, ws_h : s^*$
9:    return $(c_h, 0, 0, s_h)$      » Returns a quaternion
10: end function Once the matrix S has been brought closer to a diagonal, the asymptotic approximation becomes extremely accurate, and essentially matches the efficiency of regular Jacobi iteration (but at a fraction of the implementation cost). The inventors have observed that 4 sweeps of the method offer the same efficacy in diagonalizing S as 3 sweeps of the regular Jacobi method, and this brings the magnitude of off-diagonal entries to 4-5 order of magnitude smaller than the singular values on the diagonal. Once the symmetric eigenanalysis has been computed, the rotational factor U is computed by performing a Givens QR factorization on $AV=U\Sigma$, which generates an exactly orthogonal factor $Q=U$ and a triangular factor R which will in fact be diagonal (and equal to $\Sigma$) as long as the columns of $U\Sigma$ are sorted in descending order of magnitude by permuting them along with the columns of V. The Givens QR factorization has a completely deterministic control flow, and can also be highly vectorized. For a fuller analysis and implementation see Appendix II.

This procedure is in contrast to the simpler approach that computes the rotational factor as $R=FS^{-1}$, as demonstrated for example in [Rivers and James 2007]. Although quite efficient, such a treatment is not robust for most intended simulation tasks, where flattened or inverted elements are commonplace. In the case of an inverted element, where $\det(F)<0$ the formula $R=FS^{-1}$ would produce a matrix R that includes a reflection (i.e., $\det(R)=-1$) which violates the proper semantics of the corotated formulation, and inhibits untangling of inverted elements in practice. Similarly, for flattened elements the factor S is near-singular, which jeopardizes the orthogonality of the computed matrix R. Methods that produce the polar decomposition robustly in the case of singular or inverted F (using cross products to generate perfect rotations) will typically resort to case analysis, preventing effective vectorization. In contrast, the above Givens QR factorization has a completely deterministic control flow and is trivially vectorized.

Production System Results

The inventors tested the techniques discussed herein on a number of production-quality models, focusing on regions where artists typically struggle to achieve realistic, collision-free results using traditional rigging methods.

For example, one simulation was driven by rigid bones attached to a character's existing skeleton. Simple geometric shapes such as cylinders or ellipsoids were sufficient to define the volumetric extent of these bones, and using soft constraints with narrow bones gave the elasticity model freedom to produce appealing flesh-like shapes. More carefully modeled bones can be used as internal collision objects over which the material can slide, providing detail in regions such as the elbow or around the collarbone. The self collision handling discussed herein not only prevents interpenetration, it also works with the elastic simulation to create realistic squishing and bulging behavior. Additional artistic control can be allowed by providing the ability to spatially vary $\mu$ and $\lambda$. The hexahedral lattice can be constructed as an axis-aligned grid with uniformly sized cells in the undeformed configuration.

In addition to these basic features, one exemplary deformer was applied to sub-regions of a character mesh. Soft constraints "stitch" the simulation region to the underlying mesh in blend regions, allowing for a seamless transition. For highly stylized characters, detailed underlying structures such as muscles and tendons are often unclear or at least time consuming to create. By supporting spatially varying material parameters, the inventors were able to easily approximate many of these coarse grain features.

In further embodiments, a graphical user interface is provided that allows users to paint material parameters onto a surface mesh. The parameters then are extrapolated to a volume (e.g., the hexahedral lattice or individual cells) by solving a Laplace equation. Whereas acceptable results may be obtained with constant material parameters, better sculpt shapes can also be obtained by varying the stiffness and Poisson's ratio of a material.

The inventors benchmarked an implementation of an elasticity multigrid solver using techniques presented herein on a cube model with Dirichlet constraints on two opposite faces without collisions or point constraints. While the inventors were able to attain a convergent method with as few as 2 Jacobi smoothing sweeps per grid transfer, the inventors were able to achieve the best balance between speed and convergence rate with 5-10 Jacobi relaxation sweeps. In all cases, the first V-cycles significantly (by 1-2 orders of magnitude) lowered the residual before settling into a constant convergence rate between 0.5 and 0.75, depending on the number of relaxation sweeps. On a 32×32×32 element cube, 0.031 s was averaged on the GPU and 0.10 s on the CPU per V-cycle with 10 relaxation sweeps per grid transfer on 4 levels. On a 64×64×64 element cube, 0.086 s were averaged on the GPU and 0.56 s on the CPU per V-cycle with 10 relaxations sweeps on 5 levels.

Figure 14:
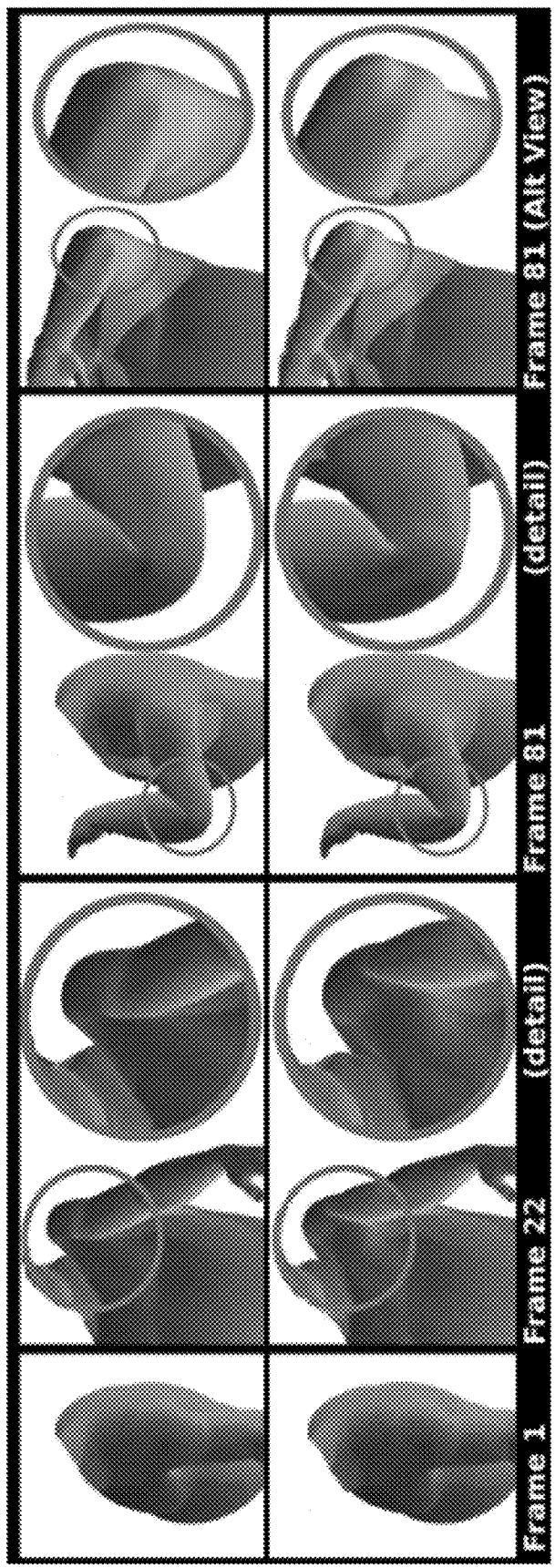
FIG. 14 illustrates application of various deformers to the arm, shoulder, and neck region of a character.

In practice, the inventors found that 1-2 V-cycles with 5 relaxation sweeps per grid transfer were sufficient for the linear solver. The number of Newton iterations required depended on the initial guess; when using the previous frame of an animation, typically, between 1 and 10 iterations were required for full convergence. All reported CPU times were computed on an 8-core Intel Xeon X5550 workstation. GPU tests were performed on an NVIDIA Quadro 6000. In one example, a deformer incorporating the disclosed techniques was applied to the arm, shoulder, and neck region of a character. In FIG. 14, the top row shows how the integrity of the region around the clavicle is lost as the character shrugs using prior methods. In the bottom row, however, everything behaves as a connected entity. On the outside of the elbow, a nice protrusion of the ulna appears as opposed to the more rubber-like behavior of a linear blend skin in the top row. Each Newton iteration averaged 0.492 s on the CPU and 0.345 s on the GPU. Average frame times were 3.22 s and 2.38 s on the CPU and GPU respectively.

Figure 15:
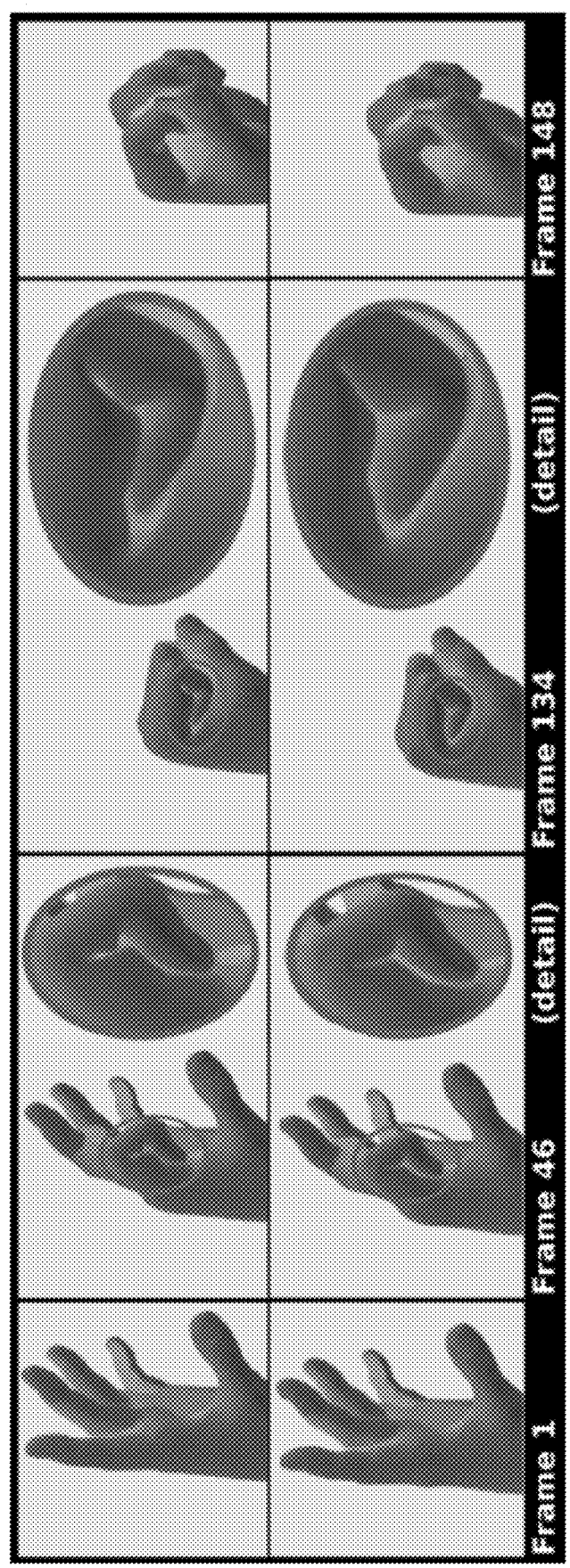
FIG. 15 illustrates application of various deformers to the hand of a character.

In FIG. 15, a deformer incorporating the disclosed techniques was applied to a character hand. In this example, the top row shows the hand rigged using linear blend skinning Due to the many joints it is impractical to model all the shapes necessary fix the artifacts using an example based technique like PSD. To compensate, a significant amount of effort was spent on creating a nice skin bind for this hand. On the bottom row, the same hand was rigged with the deformer incorporating the disclosed techniques. Note how more correct creasing and contact deformation are seen where the finger bends. On the CPU, each Newton iteration averaged 1.40 s for an average of 12.6 s per frame. On the GPU, each Newton iteration averaged 0.612 s for an average of 5.74 s per frame. In yet another example, a deformer incorporating the disclosed techniques was to the torso and arms of a large character with 106,567 elements. (see FIGS. 3A-3C). On the CPU, each Newton iteration averaged 0.876 s for a total of 5.48 s per frame. On the GPU, each Newton iteration averaged 0.762 s and 5.14 s per frame.

Hardware Summary

Figure 16:
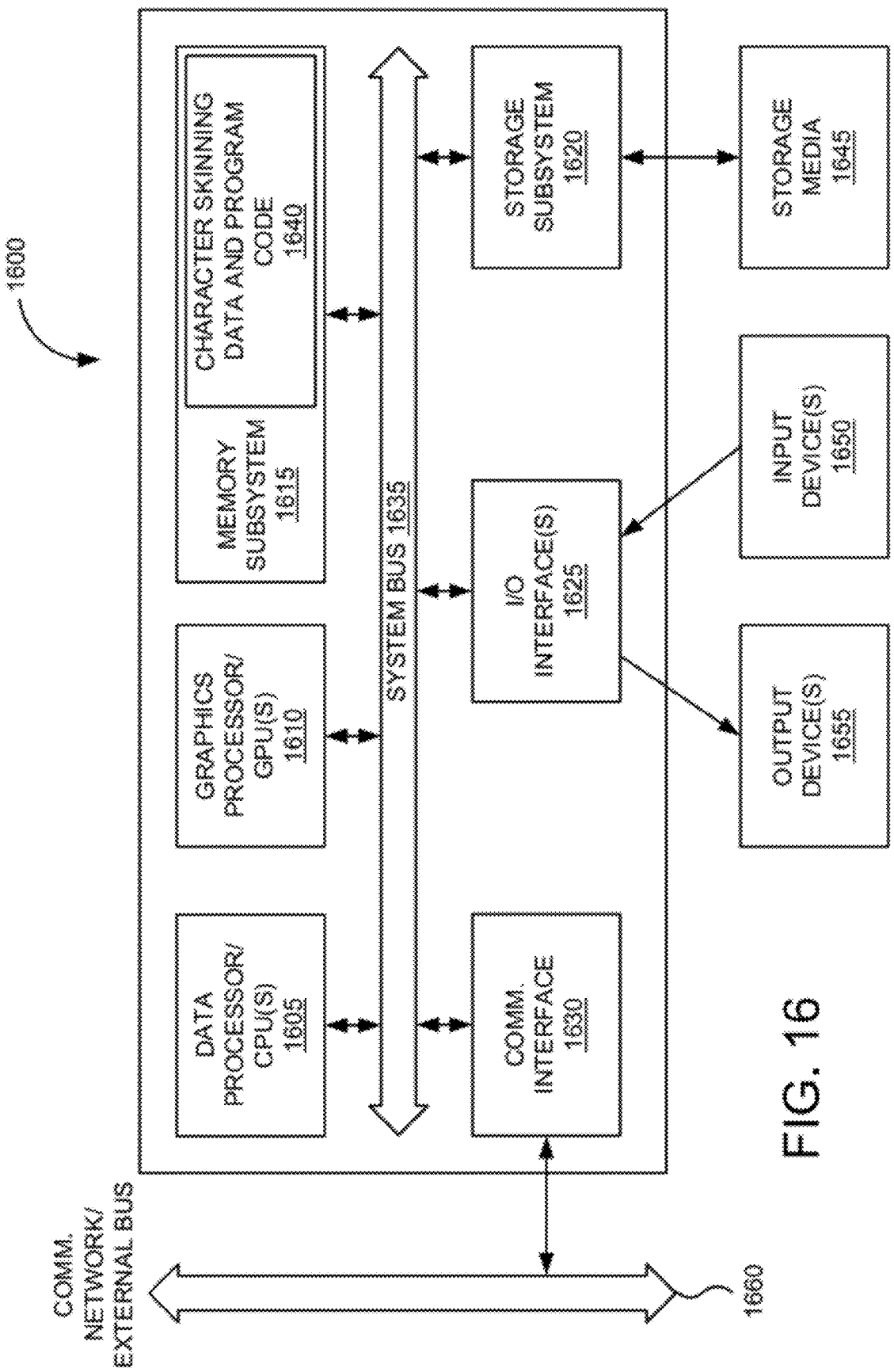
FIG. 16 is a block diagram of a computer system or information processing device that may incorporate an embodiment, be incorporated into an embodiment, or be used to practice any of the innovations, embodiments, and/or examples found within this disclosure.

FIG. 16 is a block diagram of computer system 1600 that may incorporate an embodiment, be incorporated into an embodiment, or be used to practice any of the innovations, embodiments, and/or examples found within this disclosure. FIG. 16 is merely illustrative of a computing device, general-purpose computer system programmed according to one or more disclosed techniques, or specific information processing device for an embodiment incorporating an invention whose teachings may be presented herein and does not limit the scope of the invention as recited in the claims. One of ordinary skill in the art would recognize other variations, modifications, and alternatives.

Computer system 1600 can include hardware and/or software elements configured for performing logic operations and calculations, input/output operations, machine communications, or the like. Computer system 1600 may include familiar computer components, such as one or more one or more data processors or central processing units (CPUs) 1605, one or more graphics processors or graphical processing units (GPUs) 1610, memory subsystem 1615, storage subsystem 1620, one or more input/output (I/O) interfaces 1625, communications interface 1630, or the like. Computer system 1600 can include system bus 1635 interconnecting the above components and providing functionality, such connectivity and inter-device communication. Computer system 1600 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 1605 can include hardware and/or software elements configured for executing logic or program code or for providing application-specific functionality. Some examples of CPU(s) 1605 can include one or more microprocessors (e.g., single core and multi-core) or micro-controllers. CPUs 1605 may include 4-bit, 8-bit, 16-bit, 16-bit, 32-bit, 64-bit, or the like architectures with similar or divergent internal and external instruction and data designs. CPUs 1605 may further include a single core or multiple cores. Commercially available processors may include those provided by Intel of Santa Clara, Calif. (e.g., x86, x86_64, PENTIUM, CELERON, CORE, CORE 2, CORE ix, ITANIUM, XEON, etc.), by Advanced Micro Devices of Sunnyvale, Calif. (e.g., x86, AMD_64, ATHLON, DURON, TURION, ATHLON XP/64, OPTERON, PHENOM, etc). Commercially available processors may further include those conforming to the Advanced RISC Machine (ARM) architecture (e.g., ARMv7-9), POWER and POWERPC architecture, CELL architecture, and or the like. CPU(s) 1605 may also include one or more field-gate programmable arrays (FPGAs), application-specific integrated circuits (ASICs), or other microcontrollers. The one or more data processors or central processing units (CPUs) 1605 may include any number of registers, logic units, arithmetic units, caches, memory interfaces, or the like. The one or more data processors or central processing units (CPUs) 1605 may further be integrated, irremovably or moveably, into one or more motherboards or daughter boards.

The one or more graphics processor or graphical processing units (GPUs) 1610 can include hardware and/or software elements configured for executing logic or program code associated with graphics or for providing graphics-specific functionality. GPUs 1610 may include any conventional graphics processing unit, such as those provided by conventional video cards. Some examples of GPUs are commercially available from NVIDIA, ATI, and other vendors. In various embodiments, GPUs 1610 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1610 may include any number of registers, logic units, arithmetic units, caches, memory interfaces, or the like. The one or more data processors or central processing units (CPUs) 1605 may further be integrated, irremovably or moveably, into one or more motherboards or daughter boards that include dedicated video memories, frame buffers, or the like.

Memory subsystem 1615 can include hardware and/or software elements configured for storing information. Memory subsystem 1615 may store information using machine-readable articles, information storage devices, or computer-readable storage media. Some examples of these articles used by memory subsystem 1670 can include random access memories (RAM), read-only-memories (ROMS), volatile memories, non-volatile memories, and other semiconductor memories. In various embodiments, memory subsystem 1615 can include character skinning data and program code 1640.

Storage subsystem 1620 can include hardware and/or software elements configured for storing information. Storage subsystem 1620 may store information using machine-readable articles, information storage devices, or computer-readable storage media. Storage subsystem 1620 may store information using storage media 1645. Some examples of storage media 1645 used by storage subsystem 1620 can include floppy disks, hard disks, optical storage media such as CD-ROMS, DVDs and bar codes, removable storage devices, networked storage devices, or the like. In some embodiments, all or part of character skinning data and program code 1640 may be stored using storage subsystem 1620.

In various embodiments, computer system 1600 may include one or more hypervisors or operating systems, such as WINDOWS, WINDOWS NT, WINDOWS XP, VISTA, WINDOWS 7 or the like from Microsoft of Redmond, Wash., Mac OS or Mac OS X from Apple Inc. of Cupertino, California, SOLARIS from Sun Microsystems, LINUX, UNIX, and other UNIX-based or UNIX-like operating systems. Computer system 1600 may also include one or more applications configured to execute, perform, or otherwise implement techniques disclosed herein. These applications may be embodied as character skinning data and program code 1640. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1615 and/or storage subsystem 1620.

The one or more input/output (I/O) interfaces 1625 can include hardware and/or software elements configured for performing I/O operations. One or more input devices 1650 and/or one or more output devices 1655 may be communicatively coupled to the one or more I/O interfaces 1625.

The one or more input devices 1650 can include hardware and/or software elements configured for receiving information from one or more sources for computer system 1600. Some examples of the one or more input devices 1650 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1650 may allow a user of computer system 1600 to interact with one or more non-graphical or graphical user interfaces to enter a comment, select objects, icons, text, user interface widgets, or other user interface elements that appear on a monitor/display device via a command, a click of a button, or the like.

The one or more output devices 1655 can include hardware and/or software elements configured for outputting information to one or more destinations for computer system 1600. Some examples of the one or more output devices 1655 can include a printer, a fax, a feedback device for a mouse or joystick, external storage systems, a monitor or other display device, a communications interface appropriately configured as a transceiver, or the like. The one or more output devices 1655 may allow a user of computer system 1600 to view objects, icons, text, user interface widgets, or other user interface elements.

A display device or monitor may be used with computer system 1600 and can include hardware and/or software elements configured for displaying information. Some examples include familiar display devices, such as a television monitor, a cathode ray tube (CRT), a liquid crystal display (LCD), or the like.

Communications interface 1630 can include hardware and/or software elements configured for performing communications operations, including sending and receiving data. Some examples of communications interface 1630 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 1630 may be coupled to communications network/external bus 1680, such as a computer network, to a FireWire bus, a USB hub, or the like. In other embodiments, communications interface 1630 may be physically integrated as hardware on a motherboard or daughter board of computer system 1600, may be implemented as a software program, or the like, or may be implemented as a combination thereof.

In various embodiments, computer system 1600 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 1600.

As suggested, FIG. 16 is merely representative of a general-purpose computer system appropriately configured or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may perform techniques described above as implemented upon a chip or an auxiliary processing board.

CONCLUSION

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

Reference Listing

CAPELL, S., GREEN, S., CURLESS, B., DUCHAMP, T., AND POPOVIĆ, Z. 2002. Interactive skeleton-driven dynamic deformations. In Proc. SIGGRAPH '02, 586-593.

CAPELL, S., BURKHART, M., CURLESS, B., DUCHAMP, T., AND POPOVIĆ, Z. 2005. Physically based rigging for deformable characters. In Proc. 2005 ACM SIGGRAPH/Eurographics Symp. Comput. Anim.

CHADWICK, J., HAUMANN, D., AND PARENT, E. 1989. Layered construction for deformable animated characters. In Proc. SIGGRAPH '89, 243-252.

CHAO, I., PINKALL, U., SANAN, P., AND SCHRÖDER, P. 2010. A simple geometric model for elastic deformations. ACM Trans. Graph. 29 (July), 38:1-38:6.

CLUTTERBUCK, S., AND JACOBS, J. 2010. A physically based approach to virtual character deformation. In ACM SIGGRAPH 2010 talks, SIGGRAPH '10.

DICK, C., GEORGII, J., AND WESTERMANN, R. 2011. A realtime multigrid finite hexahedra method for elasticity simulation using CUDA. Sim. Mod. Prac. Th. 19, 2, 801-816.

GALOPO, N., OTADUY, M., TEKIN, S., GROSS, M., AND LIN, M. 2007. Soft articulated characters with fast contact handling. Comput. Graph. Forum 26, 243-253.

GEORGII, J., AND WESTERMANN, R. 2006. A multigrid framework for real-time simulation of deformable bodies. Comput. Grap. 30, 3, 408-415.

IRVING, G., KAUTZMAN, R., CAMERON, G., AND CHONG, J. 2008. Simulating the devolved: finite elements on walle. In ACM SIGGRAPH 2008 talks, ACM, New York, N.Y., USA, SIGGRAPH '08, 54:1-54:1.

KAVAN, L., COLLINS, S., ŽÁRA, J., AND O'SULLIVAN, C. 2008. Geometric skinning with approximate dual quaternion blending. ACM Trans. Graph. 27, 105:1-105:23.

KRY, P., JAMES, D., AND PAI, D. 2002. Eigenskin: real time large deformation character skinning in hardware. In Proc. ACM SIGGRAPH/Eurographics Symp. Comput. Anim., 153-159.

LEWIS, J., CORDNER, M., AND FONG, N. 2000. Pose space deformation: a unified approach to shape interpolation and skeleton-driven deformation. In Proc. SIGGRAPH '00, 165-172.

MAGNENAT-THALMANN, N., LAPERRIERE, R., AND THALMANN, D. 1988. Joint-dependent local deformations for hand animation and object grasping. In Proc. Graph. Inter. '88, 26-33.

MATTHIAS, M., AND GROSS, M. 2004. Interactive virtual materials. In Proc. GI '04, 239-246.

MATTHIAS, M., DORSEY, J., MCMILLAN, L., JAGNOW, R., AND CUTLER, B. 2002. Stable real-time deformations. In Proc. 2002 ACM SIGGRAPH/Eurographics Symp. Comput. Anim., 49-54.

MERRY, B., MARAIS, P., AND GAIN, J. 2006. Animation Space: A Truly Linear Framework for Character Animation. ACM Trans. Graph. 25, 1400-1423.

MÜLLER, M., HEIDELBERGER, B., TESCHNER, M., AND GROSS, M. 2005. Meshless deformations based on shape matching. ACM Trans. Graph. 24, 471-478.

RIVERS, A., AND JAMES, D. 2007. Fastlsm: fast lattice shape matching for robust real-time deformation. ACM Trans. Graph. 26.

SIFAKIS, E., SHINAR, T., IRVING, G., AND FEDKIW, R. 2007. Hybrid simulation of deformable solids. In Proc. of ACM SIGGRAPH/Eurographics Symp. on Comput. Anim., 81-90.

SLOAN, P., ROSE, C., AND COHEN, M. 2001. Shape by example. In Proc. I3D '01, 135-143.

SUEDA, S., KAUFMAN, A., AND PAI, D. 2008. Musculotendon simulation for hand animation. ACM Trans. Graph. 27,3.

TERAN, J., SIFAKIS, E., IRVING, G., AND FEDKIW, R. 2005. Robust quasistatic finite elements and flesh simulation. Proc. of the 2005 ACM SIGGRAPH/Eurographics Symp. on Comput. Anim., 181-190.

TERZOPOULUS, D., AND WATERS, K. 1990. Physically-based facial modeling, analysis and animation. J. Vis. Comput. Anim. 1, 73-80.

TWIGG, C., AND KAČIĆ-ALESIĆ, Z. 2010. Point Cloud Glue: constraining simulations using the procrustes transform. In Proceedings of the 2010 ACM SIGGRAPH/Eurographics Symposium on Computer Animation, Eurographics Association, 45-54.

WANG, C., AND PHILLIPS, C. 2002. Multi-weight enveloping: least-squares approximation techniques for skin animation. In Proc. 2002 ACM SIGGRAPH/Eurographics Symp. Comput. Anim., 169-138.

WU, X., AND TENDICK, F. 2004. Multigrid integration for interactive deformable body simulation. Med. Sim. 3078, 92-104.

ZHU, Y., SIFAKIS, E., TERAN, J., AND BRANDT, A. 2010. An efficient multigrid method for the simulation of high-resolution elastic solids. ACM Trans. Graph. 29, 16:1-16:18.

What is claimed is:

1. A method for deforming computer-generated objects, the method comprising:
   receiving, at one or more computer systems, information identifying a first computer-generated object;
   receiving, at the one or more computer systems, information identifying a hexahedral grid;
   receiving, at the one or more computer systems, information identifying a set of material properties;
   receiving, at the one or more computer systems, kinematic information associated with a second computer-generated object;
   determining, with one or more processors associated with the one or more computer systems, response of a continuum representation of a material at one or more cells of the hexahedral grid embedding the second object according to the set of material properties and the kinematic information associated with the second object based on a stabilized energy discretization over the one or more cells of the hexahedral grid utilizing a one point quadrature at each of the one or more cells, wherein the one point quadrature is stabilized according to an integration rule applied to a portion of an energy density function;
   generating, with the one or more processors associated with the one or more computer systems, information configured to deform the first object from a first configuration to a second configuration based on the determined response of the continuum representation of the material; and
   storing the information configured to deform the first object from the first configuration to the second configuration in a storage device associated with the one or more computer systems.

2. The method of claim 1 wherein receiving, at the one or more computer systems, the information identifying the hexahedral grid comprises receiving information specifying a uniform and regular hexahedral lattice.

3. The method of claim 1 wherein the continuum representation of the material comprises a co-rotational linear model of elasticity.

4. The method of claim 1 wherein determining, with the one or more processors associated with the one or more computer systems, the response of the continuum representation of the material at the one or more cells of the hexahedral grid embedding the second object according to the set of material properties and the kinematic information associated with the second object comprises performing a single polar decomposition operation at each of the one or more cells.

5. The method of claim 1 wherein determining, with the one or more processors associated with the one or more computer systems, the response of the continuum representation of the material at the one or more cells of the hexahedral grid embedding the second object according to the set of material properties and the kinematic information associated with the second object based on the stabilized energy discretization over the one or more cells of the hexahedral grid utilizing the one point quadrature at each of the one or more cells further comprises determining a portion of another energy discretization.

6. The method of claim 1 wherein determining, with the one or more processors associated with the one or more computer systems, the response of the continuum representation of the material at the one or more cells of the hexahedral grid embedding the second object according to the set of material properties and the kinematic information associated with the second object further comprises identifying one or more constraints in the hexahedral grid.

7. The method of claim 6 wherein the one or more constraints in the hexahedral grid are configured to handle self collisions.

8. The method of claim 6 wherein the one or more constraints in the hexahedral grid are configured to handle collisions with other objects.

9. The method of claim 1 wherein determining, with the one or more processors associated with the one or more computer systems, the response of the continuum representation of the material at the one or more cells of the hexahedral grid embedding the second object according to the set of material properties and the kinematic information associated with the second object comprises:
   determining a hierarchy of discretizations wherein at least one coarse level in the hierarchy subsamples the deformation gradient of a deformation; and
   determining the response using a multigrid method and the hierarchy of discretizations.

10. The method of claim 1 wherein determining, with the one or more processors associated with the one or more computer systems, the response of the continuum representation of the material at the one or more cells of the hexahedral grid embedding the second object according to the set of material properties and the kinematic information associated with the second object comprises generating information projecting each stiffness matrix associated with the one or more cells to its positive semi-definite counterpart.

11. The method of claim 1 wherein determining, with the one or more processors associated with the one or more computer systems, the response of the continuum representation of the material at the one or more cells of the hexahedral grid embedding the second object according to the set of material properties and the kinematic information associated with the second object comprises determining the response using an exact derivative rather than an approximate derivative.

12. The method of claim 1 wherein determining, with the one or more processors associated with the one or more computer systems, the response of the continuum representation of the material at the one or more cells of the hexahedral grid embedding the second object according to the set of material properties and the kinematic information associated with the second object comprises determining a portion of the response using a matrix-free representation of force derivatives.

13. The method of claim 1 wherein determining, with the one or more processors associated with the one or more computer systems, the response of the continuum representation of the material at the one or more cells of the hexahedral grid embedding the second object according to the set of material properties and the kinematic information associated with the second object comprises determining a portion of the response using a matrix-free extraction of diagonal elements of a force derivative.

14. A non-transitory computer-readable medium storing computer-executable code for deforming computer-generated objects, the non-transitory computer-readable medium comprising:
   code for receiving information identifying a first computer-generated object;
   code for receiving information identifying a hexahedral grid;
   code for receiving information identifying a set of material properties;

code for receiving kinematic information associated with a second computer-generated object;

code for determining response of a continuum representation of a material at one or more cells of the hexahedral grid embedding the second object according to the set of material properties and the kinematic information associated with the second object based on a stabilized energy discretization over the one or more cells of the hexahedral grid utilizing a one point quadrature at each of the one or more cells, wherein the one point quadrature is stabilized according to an integration rule applied to a portion of an energy density function; and code for generating information configured to deform the first object from a first configuration to a second configuration based on the determined response of the continuum representation of the material.

15. The non-transitory computer-readable medium of claim 14 wherein the code for receiving the information identifying the hexahedral grid comprises code for receiving information specifying a uniform and regular hexahedral lattice.

16. The non-transitory computer-readable medium of claim 14 wherein the continuum representation of the material comprises a co-rotational linear model of elasticity.

17. The non-transitory computer-readable medium of claim 14 wherein the code for determining the response of the continuum representation of the material at the one or more cells of the hexahedral grid embedding the second object according to the set of material properties and the kinematic information associated with the second object comprises code for performing a single polar decomposition operation at each of the one or more cells.

18. The non-transitory computer-readable medium of claim 14 wherein the code for determining the response of the continuum representation of the material at the one or more cells of the hexahedral grid embedding the second object according to the set of material properties and the kinematic information associated with the second object based on the stabilized energy discretization over the one or more cells of the hexahedral grid utilizing the one point quadrature at each of the one or more cells further comprises code for determining a portion of an energy discretization using a cell-centered one-point quadrature.

19. The non-transitory computer-readable medium of claim 14 wherein the code for determining the response of the continuum representation of the material at the one or more cells of the hexahedral grid embedding the second object according to the set of material properties and the kinematic information associated with the second object further comprises code for identifying one or more constraints in the hexahedral grid.

20. The non-transitory computer-readable medium of claim 14 wherein the code for determining the response of the continuum representation of the material at the one or more cells of the hexahedral grid embedding the second object according to the set of material properties and the kinematic information associated with the second object comprises code for generating information projecting each stiffness matrix associated with the one or more cells to its positive semi-definite counterpart.

21. The non-transitory computer-readable medium of claim 14 wherein the code for determining the response of the continuum representation of the material at the one or more cells of the hexahedral grid embedding the second object according to the set of material properties and the kinematic information associated with the second object comprises code for determining the response using an exact derivative rather than an approximate derivative.

22. A method for deforming computer-generated objects, the method comprising:

receiving, at one or more computer systems, information identifying a first computer-generated object;

receiving, at the one or more computer systems, information identifying a hexahedral grid;

receiving, at the one or more computer systems, information identifying a set of material properties;

receiving, at the one or more computer systems, kinematic information associated with a second computer-generated object;

determining, with one or more processors associated with the one or more computer systems, response of a continuum representation of a material at one or more cells of the hexahedral grid embedding the second object according to the set of material properties and the kinematic information associated with the second object based on an energy split at each of the one or more cells of the hexahedral grid that partitions an energy into a first, linear portion and at least one approximation, wherein the at least one approximation is stabilized according to an integration rule applied to a portion of an energy density function;

generating, with the one or more processors associated with the one or more computer systems, information configured to deform the first object from a first configuration to a second configuration based on the determined response of the continuum representation of the material; and storing the information configured to deform the first object from the first configuration to the second configuration in a storage device associated with the one or more computer systems.

* * * * *